United States Patent [19]
Nakamura et al.

[11] Patent Number: 5,830,050
[45] Date of Patent: Nov. 3, 1998

[54] METHOD AND APPARATUS FOR ENCASING SAUSAGES OR THE LIKE

[75] Inventors: Minoru Nakamura, Tokyo; Minoru Kasai, Ebina; Nobuo Kimura, Sagamihara, all of Japan

[73] Assignee: Hitec Co., Ltd., Tokyo, Japan

[21] Appl. No.: 566,831

[22] Filed: Dec. 4, 1995

[30] Foreign Application Priority Data

Dec. 5, 1994 [JP] Japan ..................................... 6-330195

[51] Int. Cl.⁶ .................................................. A22C 11/02
[52] U.S. Cl. ................................ 452/31; 452/32; 452/35
[58] Field of Search .................................. 452/35, 30, 31, 452/32, 33, 40, 46, 51

[56] References Cited

U.S. PATENT DOCUMENTS

| | | | |
|---|---|---|---|
| 4,112,546 | 9/1978 | Müller | 452/35 |
| 4,558,488 | 12/1985 | Martinek | 452/31 |
| 4,563,792 | 1/1986 | Niedecker | 452/32 |
| 4,646,386 | 3/1987 | Dreisin | 452/31 |
| 4,709,450 | 12/1987 | Stanley | 452/31 |
| 4,766,645 | 8/1988 | Lamartino et al. | 452/31 |
| 5,092,813 | 3/1992 | Kasai et al. | 452/46 |
| 5,199,921 | 4/1993 | Townsend | 452/30 |

FOREIGN PATENT DOCUMENTS 1236671 5/1961 France ..................................... 452/35

*Primary Examiner*—Willis Little
*Attorney, Agent, or Firm*—Evenson, McKeown, Edwards & Lenahan, P.L.L.C.

[57] ABSTRACT

A method of and an apparatus for manufacturing sausages or the like. The apparatus includes a stuffing pump for supplying a material to be stuffed; a stuffing nozzle over which a casing is fitted and which receives the material to be stuffed fed out from the stuffing pump; a hampering member into which the tip of the stuffing nozzle is inserted; and a conveying device for conveying the casing in which the material to be stuffed discharged from the hampering member is stuffed, wherein the material to be stuffed is continuously discharged from the tip of the stuffing nozzle into the casing while the casing is being pulled in its longitudinal direction by the hampering member and the conveying device.

23 Claims, 25 Drawing Sheets

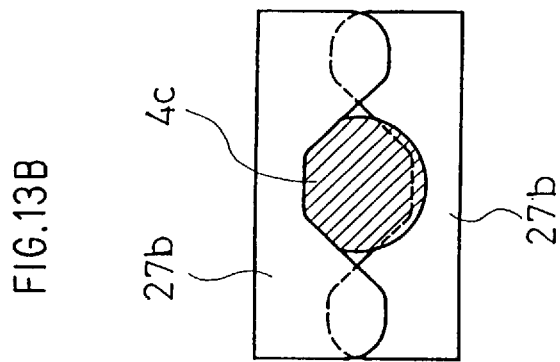
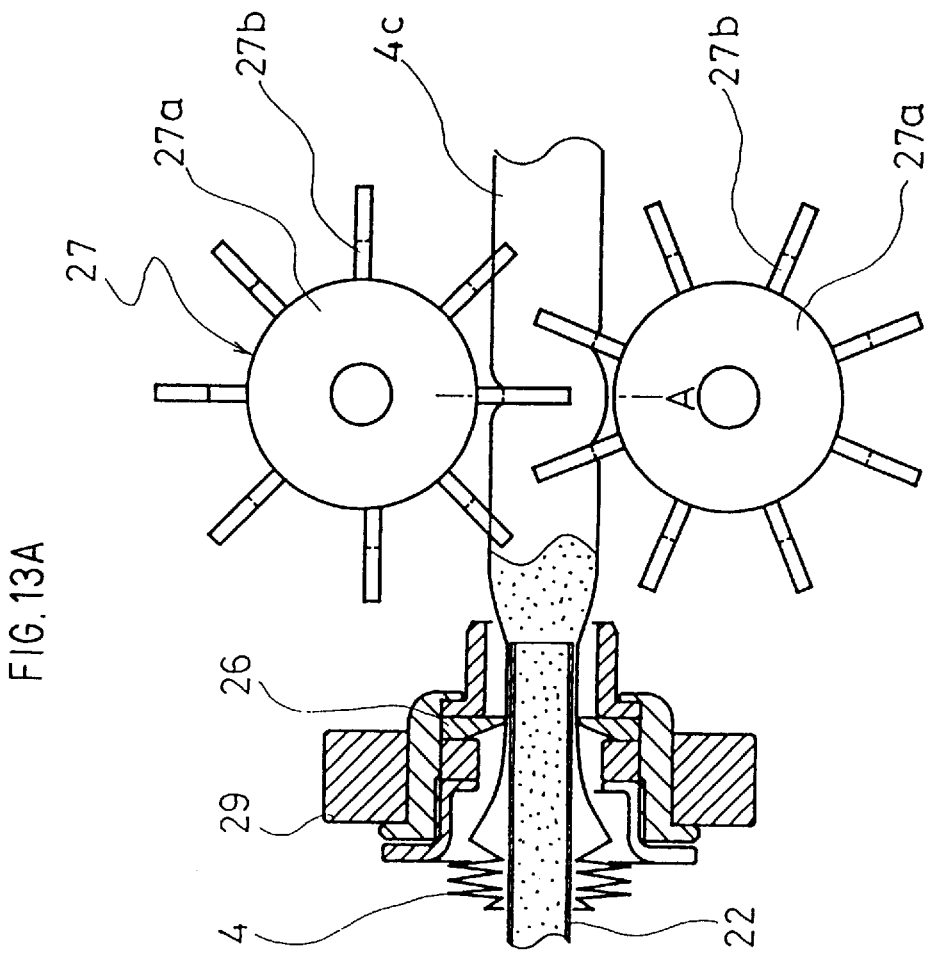

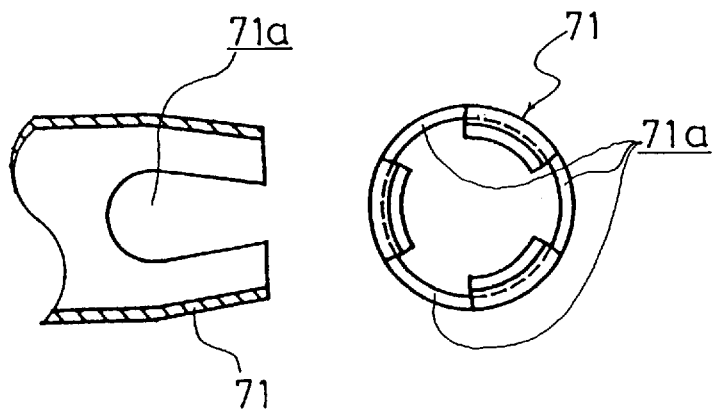

METHOD AND APPARATUS FOR ENCASING SAUSAGES OR THE LIKE

BACKGROUND OF THE INVENTION

1. Field of the Invention

The present invention relates to a method and an apparatus for manufacturing elongated rod-like sausages, and more particularly to a method and an apparatus for continuously stuffing a casing fitted in a stuffer nozzle with a material to be stuffed so as to manufacture elongated rod-like sausages.

2. Description of the Related Art

A particular sausage or another similar product is manufactured by stuffing a natural casing such as a sheep's gut or a hog's gut, or an artificial casing such as a cellulose casing or a collagen casing, with a material to be stuffed into an elongated rod-like shape (hereafter, this type of stuffing or encasing will be referred to as the "straight stuffing or encasing")

Under the present circumstances, straight stuffing is conventionally effected by using the following manufacturing apparatus (refer to Japanese Patent Application Laid-Open No. 114256/1980).

Namely, a material to be filled, such as a coarsely chopped or ground product, is accommodated in a cylindrical hydraulic or pneumatic stuffer, and this material to be stuffed is fed out and is sent into a stuffer nozzle by means of a feeding piston. A casing is fitted over the stuffer nozzle by a manual operation, and a fixed amount of the material to be stuffed is continuously fed into the casing from the tip of the stuffer nozzle under a fixed pressure.

As the material to be stuffed is stuffed into the casing from the tip of the stuffer nozzle, the casing is drawn out from the stuffer nozzle. At that time, as an operator manually applies a brake to the casing fitted over the stuffer nozzle, the drawing-out speed is adjusted so as to obtain a product having a predetermined degree of stuffing.

Meanwhile, a method and an apparatus for straight encasing disclosed in Japanese Pat. Application Laid-Open No. 73508/1983 have the following features in the arrangement.

Namely, there is provided a conveyor device having a pair of endless flat belts having a traveling section and facing each other in a vertical direction at an interval therebetween. A stuffed casing which is deformed in an elliptical cross-sectional shape over the traveling section of the conveyor device is conveyed by the conveyor device in a direction away from the nozzle.

The straight-stuffed product obtained by the above-described stuffing operation is processed, for example, in the following manner.

In one case, the straight-stuffed product thus obtained, after being subjected to heat treatment and dry processing, is cut to a fixed dimension (e.g., 150 mm) so as to be formed as a Salami product (feef stick).

In another case, after the straight stuffing is carried out, the straight-stuffed product is twisted to a fixed dimension to form linked sausages, which are then frozen to obtain fresh sausages.

Incidentally, instead of the stuffer pump mechanism using the aforementioned stuffer, it is possible to use a stuffer pump mechanism using a vane pump. The stuffer pump mechanism using the vane pump is publicly known (refer to Japanese Patent Application Laid-Open No. 189391/1991).

However, the following drawbacks are experienced with the straight stuffing according to the above-described prior art.

In general, in a case where a hard material to be stuffed is used, or a material to be stuffed is stuffed to a diameter smaller than a standard stuffing diameter of the casing, the following problem is encountered. Namely, while the material to be stuffed is being stuffed in the casing, air is liable to be entrained in the material to be stuffed through a gap between the nozzle and the casing. As a result, there is the possibility of manufacturing a product in which bubbles are mixed. The elimination of such bubbles has been desired particularly in the case of a Salami product formed of a coarsely-chopped, hard material to be filled, or a product which is linked after straight stuffing with a soft degree of stuffing.

The stuffed material discharged from the tip of the nozzle into the casing produces a force acting on the casing in a direction in which the casing is pulled out from the nozzle and a force acting on the casing in a direction in which the diameter of the casing is expanded. In the straight stuffing of an artificial casing based on a manual operation, since the braking force with respect to the casing through the manual operation by the operator is not fixed, with the result that the force acting on the casing in the direction in which the casing is pulled out from the nozzle and the force acting on the casing in the direction in which the diameter of the casing is expanded are not fixed. For this reason, the diameter of the casing filled with the material to be stuffed does not become uniform. In addition, there are cases where the anti-expansion strength of one casing is not necessarily fixed over its entire length. For this reason, the variation of the amount of expansion of the casing is promoted, and the amount of expansion of the casing varies for respective portions of one casing, so that the diameter of the stuffed casing does not become uniform.

In addition, with the method and the apparatus for straight encasing disclosed in Japanese Patent Application Laid-Open No. 73508/1983, straight stuffing is carried out with respect to an artificial casing. However, since the cross-sectional shape of the stuffed casing assumes the same elliptical shape in the overall area of the traveling section, in the case of the product which is straight-stuffed under a low stuffing pressure, slip is liable to occur between the straight-stuffed product and the conveyor device. Hence, the diameter of the stuffed casing is difficult to become uniform.

In the straight stuffing of a natural gut casing on the basis of the manual operation, the operator carries out the stuffing operation while adjusting the manual casing-braking force, such that the stuffing degree (stuffing pressure) is made uniform with respect to various portions of one natural gut having variations in the diameter over its entire length. In the case of the product in which a natural gut is straight-stuffed, the stuffing diameter varies substantially, with the result that the weight of the stuffed product per unit length does not become uniform. The actual weight of the product is often in excess of the set weight for sale, so that the product cost increases by that margin.

In addition, with the conventionally known straight-encasing apparatus, there are many work processes which rely on the manual operation, so that productivity is poor, and the product cost becomes high.

In a case where it is desired to market conventionally known products in which natural gut casings are straight-stuffed (products in which the stuffing diameter differs substantially in various portions), the production is limited to skilled stuffing operators, so that the product cost becomes high.

SUMMARY OF THE INVENTION

In view of the above-described circumstances, it is an object of the present invention to provide a method and an apparatus for effecting automatic straight encasing using a machine, thereby overcoming the above-described drawbacks of the conventionally known straight stuffing.

To this end, in accordance with one aspect of the present invention, there is provided a method of encasing sausages or the like for manufacturing straight sausages or the like, comprising the steps of: fitting a natural gut casing over a stuffing nozzle; inserting a tip of the stuffing nozzle with the natural gut casing fitted over the stuffing nozzle into a hampering member; causing a material to be stuffed to be discharged from the tip of the stuffing nozzle into the natural gut casing by pressurizing means; causing the natural gut casing to be paid out from the tip of the stuffing nozzle while a brake is being applied to the natural gut casing fitted over the stuffing nozzle; causing the natural gut casing stuffed with the material to be stuffed to be received by a conveying device; conveying the stuffed natural gut casing in a straight shape away from the tip of the stuffing nozzle by the conveying device which undergoes continuous movement at a fixed speed, so as to pull the natural gut casing in its longitudinal direction; and stuffing a fixed amount of the material to be stuffed continuously into the pulled natural gut casing from the stuffing nozzle, so as to manufacture a straight sausage or the like.

In accordance with another aspect of the present invention, there is provided a method of encasing sausages or the like for manufacturing straight sausages or the like, comprising the steps of: fitting a casing over a stuffing nozzle; inserting a tip of the stuffing nozzle with the casing fitted over the stuffing nozzle into a hampering member; causing a material to be stuffed to be discharged from the tip of the stuffing nozzle into the casing by pressurizing means; causing the casing to be paid out from the tip of the stuffing nozzle while a brake is being applied to the casing fitted over the stuffing nozzle; causing the casing stuffed with the material to be stuffed to be received by a conveying device; conveying the stuffed casing in a straight shape away from the tip of the stuffing nozzle by the conveying device which undergoes continuous movement at a fixed speed; causing the straight stuffed casing conveyed by the conveying device to be suspended from a suspending member of a suspending device in a loop form; inserting a rod member into the loop of the straight stuffed casing; and delivering the straight stuffed casing in the loop form onto the rod member so as to remove the straight stuffed casing in the loop form from the suspending device.

In the method of encasing sausages or the like, a lower portion of the loop of the straight stuffed casing suspended in the loop form is cut by a loop-cutting device.

In the method of encasing sausages or the like, the rod member is detachably attached to the suspending device, and the straight stuffed casing suspended in the loop form from the suspending member of the suspending device is expanded toward both sides of a distal end of the rod member by loop-expanding means such that the distal end of the rod member is inserted into the loop of the straight stuffed casing.

In accordance with still another aspect of the present invention there is provided an apparatus for encasing sausages or the like for manufacturing straight sausages or the like, comprising: pressurizing means for supplying a material to be stuffed; a stuffing nozzle over which a casing is fitted, and which receives the material to be stuffed fed out from the pressurizing means and discharges the same from a tip thereof; a hampering member into which the tip of the stuffing nozzle is inserted; driving means for moving the stuffing nozzle and the hampering member relative to each other and positioning the tip of the stuffing nozzle at a position in which the tip of the stuffing nozzle is inserted in the hampering member and at a position in which the tip of the stuffing nozzle is removed from the hampering member; and a conveying device for conveying the casing in which the material to be stuffed discharged from the hampering member is stuffed, wherein the stuffed casing is conveyed while the material to be stuffed is being continuously discharged into the casing from the tip of the stuffing nozzle in a state in which a brake is being applied by the hampering member to a portion of the casing in which the material to be stuffed is not stuffed.

In accordance with a further aspect of the present invention, there is provided an apparatus for encasing sausages or the like for manufacturing straight sausages or the like, comprising: pressurizing means for supplying a material to be stuffed; a stuffing nozzle over which a casing is fitted, and which receives the material to be stuffed fed out from the pressurizing means and discharges the same from a tip thereof; a hampering member into which the tip of the stuffing nozzle is inserted; driving means for moving the stuffing nozzle and the hampering member relative to each other and positioning the tip of the stuffing nozzle at a position in which the tip of the stuffing nozzle is inserted in the hampering member and at a position in which the tip of the stuffing nozzle is removed from the hampering member; and a conveying device for conveying the casing in which the material to be stuffed discharged from the hampering member is stuffed, wherein the stuffed casing is conveyed while the material to be stuffed is being continuously discharged into the casing from the tip of the stuffing nozzle in a state in which a brake is being applied by the hampering member to a portion of the casing in which the material to be stuffed is stuffed.

In the apparatus for encasing sausages or the like, the casing is an artificial casing, and the apparatus may further comprise: a positioning member which abuts against a trailing end of the artificial casing; advancing means for forwardly advancing the positioning member toward the tip of the stuffing nozzle; detecting means for detecting an forwardly advanced position of the positioning member; moving means for reciprocating the stuffing nozzle; nipping members provided in the conveying device to nip the straight stuffed casing; and automatic casing-supplying means for supplying the casing in such a manner that the casing is automatically fitted over the stuffing nozzle.

In the apparatus for encasing sausages or the like, the casing is a natural gut casing, and the apparatus may further comprise: a positioning member for defining a position of a rear portion of the natural gut casing fitted over the stuffing nozzle; and detecting means for detecting a change in a form of the rear portion of the natural gut casing, the pressurizing means being stopped by the detecting means to complete stuffing.

In the apparatus for encasing sausages or the like, the positioning member is stopped in a predetermined position while the material to be stuffed is being stuffed into the natural gut casing from the stuffing nozzle.

The apparatus for encasing sausages or the like may further comprise: means for detecting a degree of stuffing of the casing stuffed with the material to be stuffed, wherein the degree of stuffing of the material to be stuffed in the casing is controlled within a predetermined range by controlling a rate of discharge by the pressurizing means in accordance with the degree of stuffing.

The apparatus for encasing sausages or the like may further comprise: a suspending device for suspending the casing stuffed with the material to be stuffed and conveyed by the conveying device, from a suspending member in a loop form.

The apparatus for encasing sausages or the like may further comprise: a loop-cutting device for cutting a lower portion of the casing suspended in the loop form.

The apparatus for encasing sausages or the like may further comprise: loop-expanding means for expanding the straight stuffed casing suspended in the loop form toward both sides of a distal end of a rod member such that the distal end of the rod member is inserted into the loop of the straight stuffed casing.

The apparatus for encasing sausages or the like may further comprise: linking means for twisting the straight stuffed casing fed out from the conveying device to form a linked stuffed casing.

The allowing of the tip of the stuffing nozzle to be located inside the hampering member and the insertion of the tip of the stuffing nozzle through the hampering member in such a way as to project outside the hampering member will be referred to in the present invention as the insertion of the tip of the stuffing nozzle into the hampering member.

According to the method and the apparatus for encasing sausages or the like in accordance with the present invention, the following advantages are offered.

It is possible to reduce the entrainment of air in the state in which the material to be stuffed is stuffed in the casing.

Since the automatic encasement is based on the apparatus which is capable of detecting the completion of stuffing into natural gut casings such as sheep's guts and hog's guts, productivity improves, and the manufacturing cost can be lowered.

In the case of artificial casings such as collagen casings, fully automatic straight stuffing is possible, so that productivity improves appreciably.

Since stuffing is stopped in the event that the casing is ruptured while the material to be stuffed is being stuffed into the casing, the vicinities of the apparatus are prevented from becoming stained.

The stuffing diameter of the stuffed casing becomes fixed, so that the weight of the products becomes fixed.

Although natural gut casings, such as sheep's guts and hog's guts, have variations in the outside diameter peculiar to the individual casings, since the stuffing is effected while the casing is being pulled, such peculiar variations in the outside diameter can be absorbed, and the outside diameter of the stuffed casing can be made substantially uniform. Hence, it is possible to obtain products which are straight-stuffed in natural guts and have stuffed weight which is close to the set weight for sale.

The natural gut casings, such as sheep's guts and hog's guts, have longitudinal bends or curves peculiar to the individual casings, and such bends or curves appear in the form of the bends of curves of the products when the material to be stuffed is stuffed. However, since stuffing is carried out while pulling the casing, it is possible to substantially absorb and reduce such peculiar bends or curves.

If the suspending device is jointly installed, it is possible to obtain an automatic looping system for looping straight-stuffed products. If the loop-cutting device is also jointly installed, it is possible to manufacture straight-stuffed products having shapes in which there are no bends at the lower suspended portions.

In the case of natural gut casings, such as sheep's guts and hog's guts, it is possible to automatically increase or decrease the stuffing rate depending on the variations of the outside diameter peculiar to the individual casings, thereby making the stuffing degree uniform. Skilled operators are made unnecessary, and a reduction in cost can be attained.

The above and other objects, features and advantages of the present invention will become more apparent from the followed detailed description of the invention when read in conjunction with the accompanying drawings.

BRIEF DESCRIPTION OF THE DRAWINGS

FIGS. 4A to 4E are diagrams illustrating nipping plates provided on a conveying device, in which FIG. 4A is a top plan view in which the nipping plates are positionally offset from each other, FIG. 4B is a top plan view in which the nipping plates are positioned in face-to-face relation with each other, FIG. 4C is a cross-sectional view of a section A taken along the direction of the arrow A in FIG. 4A, FIG. 4D is a cross-sectional view of a section B taken along the direction of the arrow B in FIG. 4A, and FIG. 4E is a cross-sectional view of a section C taken along the direction of the arrow C in FIG. 4B;

FIG. 13A is an enlarged plan view, with portions broken away and in section, of a tip of a stuffing nozzle and its vicinity shown in FIG. 12;

FIG. 13B is a vertical cross-sectional view of a section A shown in FIG. 13A;

FIG. 27A is a cross-sectional view illustrating a tip portion of the stuffing nozzle which is used in the present invention; and FIG. 27B is a front elevational view illustrating the tip portion of the stuffing nozzle shown in FIG. 27A.

DESCRIPTION OF THE PREFERRED EMBODIMENTS

Figure 1:
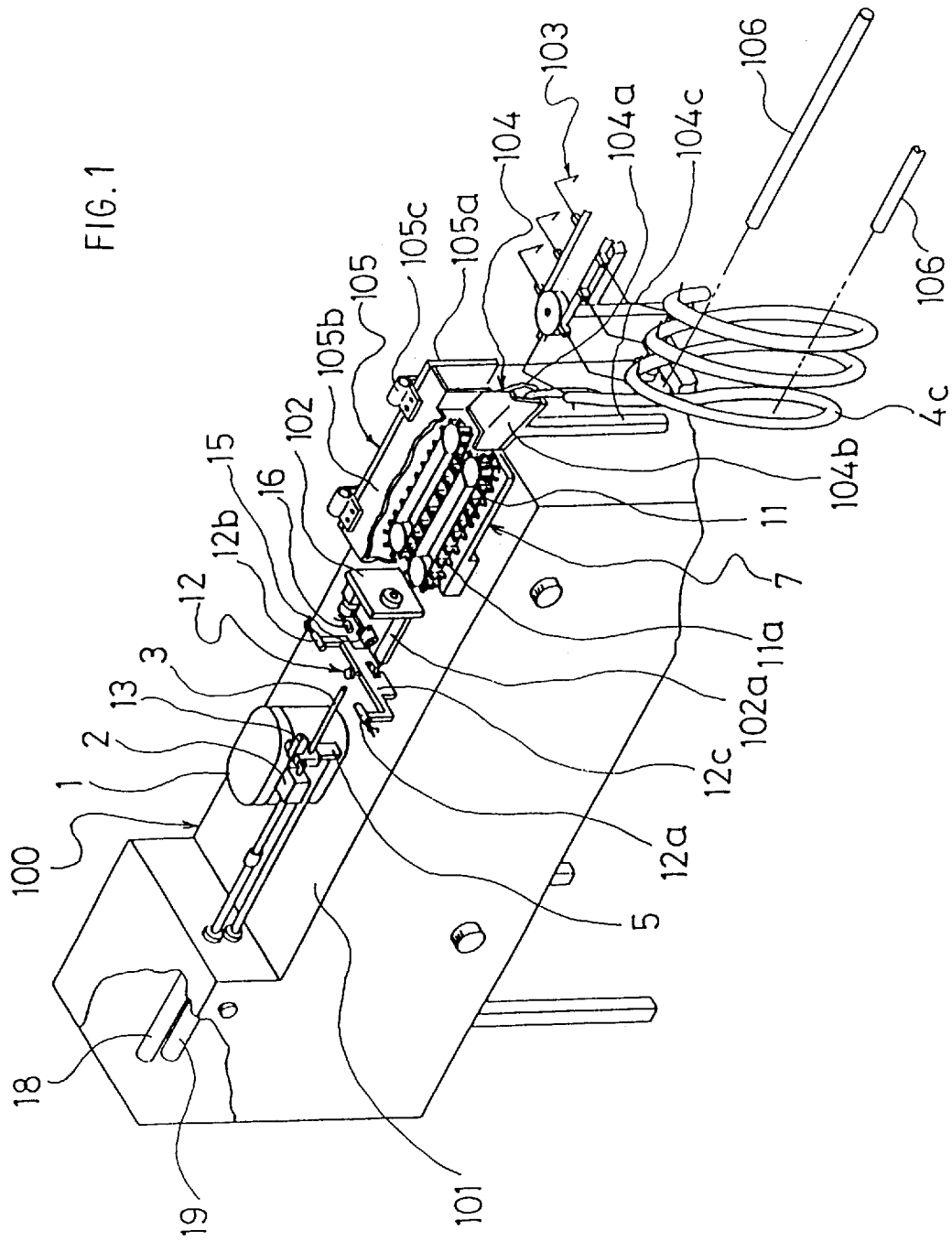
FIG. 1 is a perspective view illustrating an apparatus for straight-encasing sausages or the like in accordance with an embodiment of the present invention.
Figure 2:
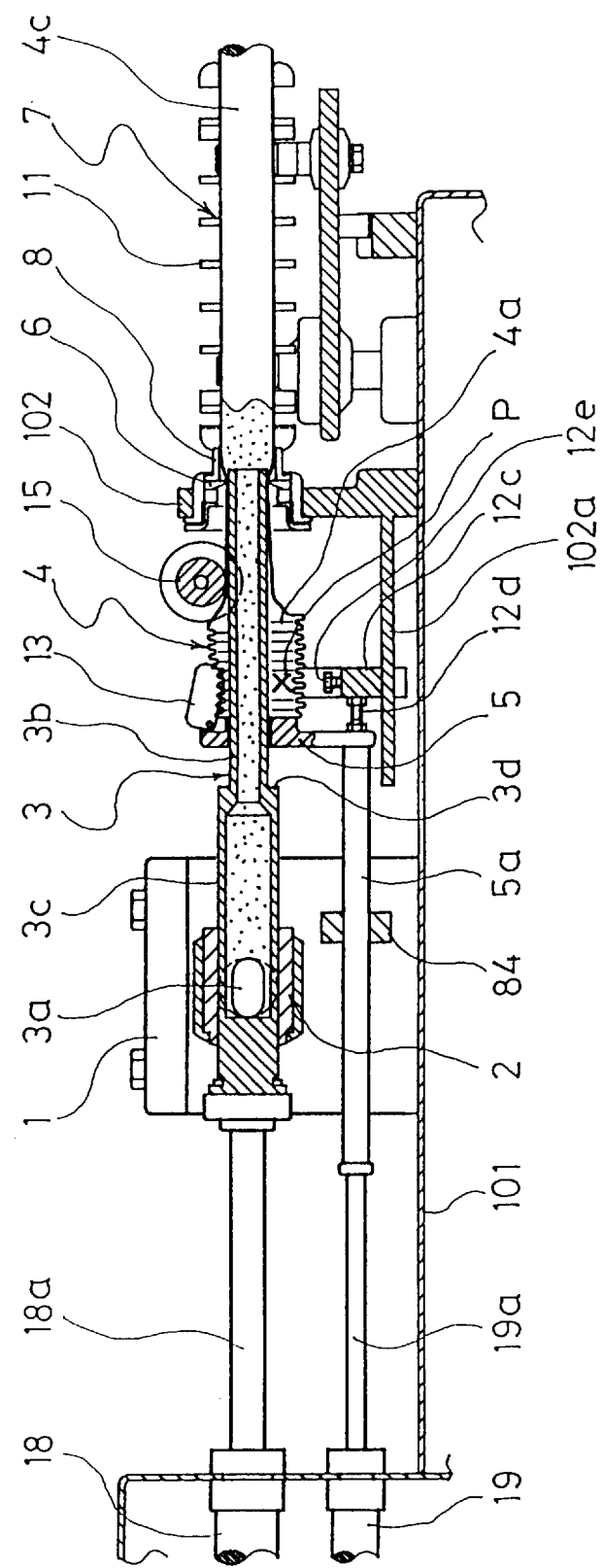
FIG. 2 is a front elevational view, with portions broken away and in section, of the encasing apparatus shown in FIG. 1.
Figure 3:
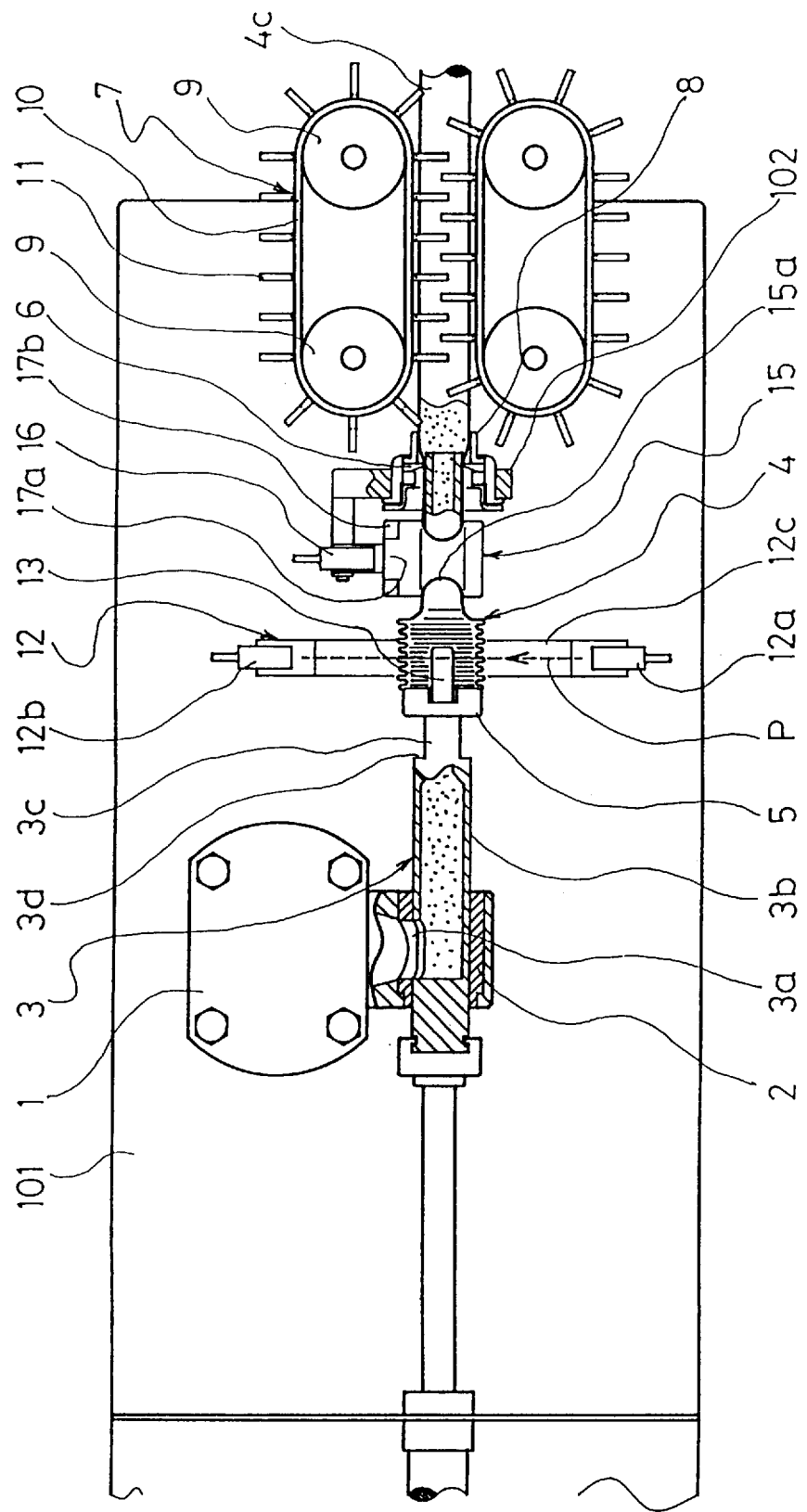
FIG. 3 is a plan view, with portions broken away and in section, of the encasing apparatus shown in FIG. 1.

Referring now to FIGS. 1 to 3, a description will be given of the overall structure of an apparatus for the straight encasing of sausages or the like, which is particularly suited to a natural gut casing (hereafter referred to as the casing) in accordance with an embodiment of the present invention. Among these drawings, FIG. 1 is a perspective diagram illustrating the positional relationships in the step for fitting the casing over a stuffing nozzle. The state shown in FIGS. 2 and 3 show the positional relationships in the state in which a material to be stuffed is being stuffed into the casing from the stuffing nozzle.

In the drawings, reference numeral 100 denotes a straight-encasing apparatus, and numeral 1 denotes a stuffing pump serving as a pressurizing means for discharging under pressure a material to be stuffed, such as a coarsely chopped material or a ground material. Here, the stuffing pump 1 includes a known metering pump, such as a gear pump, a vane pump, or a piston-type stuffer. Numeral 2 denotes a stuffing block for accommodating the material to be stuffed which has been discharged from the stuffing pump 1, and numeral 3 denotes a stuffing nozzle for stuffing the material to be stuffed, which has been discharged from the stuffing pump 1, into a casing 4 which will be described later. Here, the stuffing nozzle 3 has a stepped pipe-like structure having a small-diameter portion 3b and a large-diameter portion 3c. A hole 3a is formed in the stuffing nozzle 3, and when the hole 3a is positioned in the stuffing block 2, the material to be stuffed is fed into the stuffing nozzle 3 through the hole 3a. The stuffing nozzle 3 is connected to a rod 18a of a cylinder 18, and reciprocates in the stuffing block 2 by means of the cylinder 18.

A rod 5a connected to a rod 19a of a cylinder 19 is provided with a positioning member 5 for setting a mounting end of the casing 4 at a predetermined position. The positioning member 5 moves together with the rod 5a which reciprocates in a bearing 84 provided uprightly on the side of the stuffing pump 1. A bracket 102 provided uprightly on a cabinet 101 is disposed at a position in front of the stuffing nozzle 3, and a resilient ring 6 serving as a hampering member is provided in the bracket 102. The tip of the stuffing nozzle 3 is positioned by being inserted in the resilient ring 6 in such a manner as to project the material to be stuffed from an end face of the resilient ring 6 to outside thereof in the discharging direction of the material to be stuffed during encasing.

A guide member 8 is provided adjacent to the resilient ring 6, and the guide member 8 is used to make smooth the delivery to a conveying device 7 of a leading end of a straight stuffed casing 4c in which the material to be stuffed is filled, and is also used for the positive positioning of the leading end of the straight stuffed casing 4c. In the illustrated embodiment, the guide member 8 is formed in a flange-like tubular shape, but the guide member 8 is not limited to such a structure, and a gutter-shaped member, for example, may be used.

The conveying device 7 is adapted to pull the stuffed casing 4c and move it for an ensuing process while exerting a tensile force to the stuffed casing 4c in its longitudinal direction. The conveying device 7 is structured such that a pair of rotating mechanisms, each having a chain 10 endlessly wound around and trained between a pair of sprockets 9 and having a multiplicity of nipping plates 11 attached to the chain 10, are disposed in face-to-face relation to each other. The chain 10 and the pair of sprockets 9 can be substituted by a wrapping connector driving gear including a timing belt and a pair of timing pulleys.

A suspending device 103 is provided downstream of the conveying device 7 for suspending the stuffed casing 4c in the form of a loop. A guide member 104 for delivering the stuffed casing 4c from the conveying device 7 to the suspending device 103 is provided at an end of the conveying device 7. The conveying device 7 is covered with a cover 105. The cover 105 is comprised of a fixed plate 105a fixed to the cabinet 101, a cover member 105b provided openably on the fixed plate 105a, and hinges 105c for openably connecting the cover member 105 to the fixed plate 105a.

The guide member 104 is comprised of a guide portion 104a and a cover portion 104b, and its cross-sectional shape is substantially U-shaped to allow the stuffed casing 4c to be guided and passed therein. The guide member 104a, on the one hand, is provided on a column 104c secured to the cabinet 101, while the cover portion 104b, on the other, is formed integrally with the cover member 105b of the cover 105. The cover portion 104b can be opened upwardly together with the cover member 105b during cleaning. Incidentally, the guide member 104 is one in which a rectifying means disclosed in Japanese Patent Application Laid-Open No. 61445/1991 is made splittable.

Figure 4A:
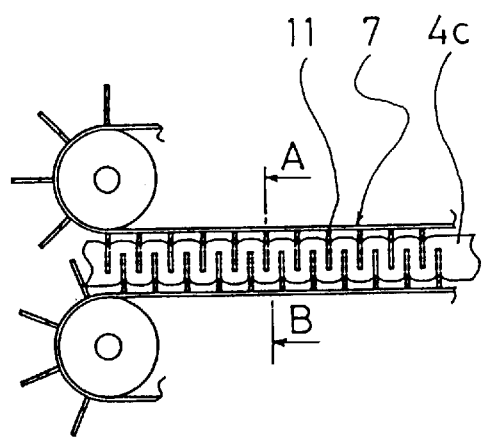

As shown in FIG. 4A, as for the nipping plates 11 which move endlessly in face-to-face relation to each other, the nipping plates 11 which face each other are positioned by being positionally offset from each other in this embodiment. In this state, the nipping plates 11 convey the straight stuffed casing 4c for the ensuing process while nipping the stuffed casing 4c. Each of the nipping plates 11 has a concave portion 11a formed therein, and a nipping portion is formed by the concave portion 11a in the state in which the nipping plates 11 face each other. As the cross-sectional shape of the straight stuffed casing 4c is deformed under a nipping pressure by the nipping portions formed by the concave portions 11a, the slippage of the casing 4c at the nipping portions is prevented, and the delivery thereof from the guide member 8 is effected positively.

Figure 4B:
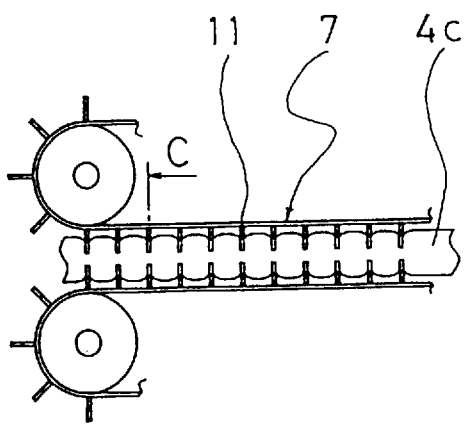
Figure 4C:
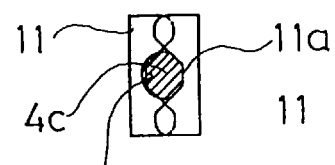
Figure 4D:
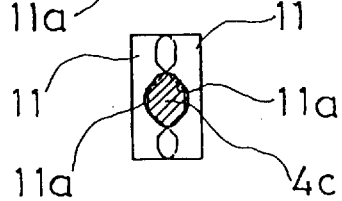
Figure 4E:
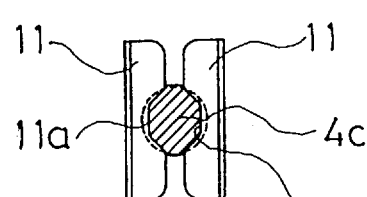

Incidentally, although in FIG. 4A the nipping plates 11 are arranged in such a manner as to be provided by being positionally offset from each other at each opposing position, an arrangement may be provided such that, as shown in FIG. 4B, the nipping plates 11 are provided at the same transverse position at each opposing position.

In either arrangement shown in FIGS. 4A and 4B, the conveying device 7 produces reduced-diameter portions and enlarged-diameter portions in the straight stuffed casing 4c over its length.

Upon completion of the stuffing of the casing 4 by the stuffing nozzle 3, the stuffing pump 1 must be stopped.

Hereafter, a description will be given of a device for detecting the completion of the straight stuffing of the casing 4 by referring to FIG. 5 as well.

A light-projecting unit 12a and a light-receiving unit 12b are respectively disposed on both sides of a trailing end of the casing 4 over the stuffing nozzle 3 into which the material to be stuffed is being stuffed. The light-projecting unit 12a and the light-receiving unit 12b constitute a photosensor 12A. A bracket 12c is disposed on the cabinet 101 in such a manner as to be positionally adjustable in the longitudinal direction of the stuffing nozzle 3, and the photosensor 12A is mounted on the bracket 12c. The light-projecting unit 12a, the light-receiving unit 12b, and the bracket 12c constitute a detecting means 12. The position of a line P (optical axis) connecting the light-projecting unit 12a and the light-receiving unit 12b is located at the trailing end of the casing 4 fitted over the stuffing nozzle 3 and suspended downward from the stuffing nozzle 3. (See FIGS. 2, 5, and 8.)

The bracket 12c is movably guided by a guide 102a. To change the mounting position of the bracket 12c, the bracket 12c is moved by the guide 102a, and is secured by a setscrew 12e.

In the illustrated state, the light from the light-projecting unit 12a is shielded by a shirred portion 4a of the casing 4 which is in a shirred compressed state, and does not reach the light-receiving unit 12b. In this state, since a sufficient length of the casing 4 remains on the stuffing nozzle 3, the discharging of the material to be stuffed from the stuffing nozzle 3 is continued.

When all the shirred portion 4a of the casing 4 fitted over the stuffing nozzle 3 is fed out, and only a nonshirred portion 4b of the casing 4 remains on the stuffing nozzle 3, the light from the light-projecting unit 12a reaches the light-receiving unit 12b, thereby detecting the completion of the stuffing of the casing 4.

The light-receiving unit 12b transmits a signal to a motor (not shown) for driving the stuffing pump 1 so as to stop the driving of the stuffing pump 1. As the signal from the light-receiving unit 12b is transmitted via a timer, the material to be stuffed can be filled up to a trailing-end position of the casing 4.

In the above description, another known sensor, e.g., a reflection-type sensor or an electrostatic sensor, can be used instead of the transmission-type photosensor 12A comprising the light-projecting unit 12a and the light-receiving unit 12b.

In addition, the detection of the completion of stuffing is not limited to the one in which the optical axis P is shielded by the shirred portion of the casing 4 in the vicinity of the trailing end, and the light becomes transmittable at the non-shirred portion, as described above. That is, the detection may be effected by detecting a change from the shirred state of the casing to the state in which the casing ceases to be present, or by detecting the state in which the casing ceases to be present from the non-shirred state of the casing. In other words, all other detecting means for detecting a change in the form of the trailing end of the casing are included.

In order to positively detect the aforementioned shirred portion 4a of the trailing end of the casing 4 fitted over the stuffing nozzle 3, a pressing member 13 serving as a separation-preventing member for pressing the shirred portion 4a of the trailing end of the casing 4 against the stuffing nozzle 3 is provided on the positioning member 5 so that the shirred portion 4a will not be removed from the positioning member 5 during encasing.

In the illustrated example, the pressing member 13 is structured such as to be provided in a cantilevered manner by means of a pin 14 and to press the casing 4 against the stuffing nozzle 3 by its own weight. However, it is possible to adopt another appropriate pressing structure, such as a structure in which the casing 4 is pressed against the stuffing nozzle 3 by means of a spring.

Alternatively, the separation-preventing member may have a structure in which the casing 4 is pressed against the positioning member 5, and the function of the separation-preventing member suffices insofar as the separation-preventing member is capable of holding the trailing end of the casing 4 until the completion of encasing.

Next, a description will be given of a mechanism whereby the stuffing from the stuffing nozzle 3 is stopped in a case where the casing 4 is ruptured while the material to be stuffed is being stuffed into the casing 4.

First, a description will be given of a device for detecting the rupture of the casing 4 by referring to FIGS. 6 and 7 as well.

The casing 4 compressed in the shirred state and fitted over the stuffing nozzle 3 is consecutively pulled out in the form of the non-shirred portion 4b, starting from the leading end of the shirred portion 4a, from the tip of the stuffing nozzle 3 as the material to be stuffed is stuffed. To detect this state of the casing 4 being pulled out, a rotating roller 15 which is brought into contact with the non-shirred portion 4b of the casing 4 is provided, and a sensor 16 for detecting the rotation of the rotating roller 15 is provided. As the sensor 16, it is possible to use a known proximity sensor, a reflection-type photosensor, or another similar sensor. The rotating roller 15 and the sensor 16 constitute a detecting means for detecting the stopping of the casing 4.

An annular recess 15a is formed on the outer peripheral surface of the rotating roller 15, and the stuffing nozzle 3 and the non-shirred portion 4b of the casing 4 are accommodated in the recess 15a. For this reason, the movement of the casing 4 being pulled out from the stuffing nozzle 3 is positively detected by the rotation of the rotating roller 15.

In the event that the casing 4 is ruptured while the material to be stuffed is being stuffed into the casing 4, the movement of the casing 4 is stopped, and the rotation of the rotating roller 15 stops. Accordingly, the stopping of the rotation of the rotating roller 15 means the rupture of the casing 4. When the rotating roller 15 stops, the stopping of the rotating roller 15 is detected by the sensor 16, and its output signal is imparted to the drive motor of the stuffing pump 1 so as to stop the discharging of the material to be stuffed by the stuffing pump 1.

Incidentally, since the device for detecting the rupture of the casing is capable of detecting the state in which the non-shirred portion 4b on the stuffing nozzle 3 has ceased to be present due to the completion of the stuffing of one casing, this device may be used jointly for the device for detecting the completion of stuffing.

If the casing 4 being pulled out from the stuffing nozzle 3 is folded or creased, it is undesirable. Accordingly, the casing 4 at the tip of the stuffing nozzle 3 should desirably be in a state in which the casing 4 is constantly stretched in a non-shirred state, i.e., in the state of the non-shirred portion 4b.

In addition, when the material to be stuffed is being stuffed into the casing 4, there is the possibility of air being entrained into the casing 4 through the gap between the stuffing nozzle 3 and the casing 4, so that this entrainment of air must be prevented.

Further, it is desirable to reduce the variation of the diameter peculiar to the casings by extending the casing 4 in its longitudinal direction by pulling out the casing 4.

The resilient ring 6 is provided as a hampering member for effecting the above-described action.

Figure 6:
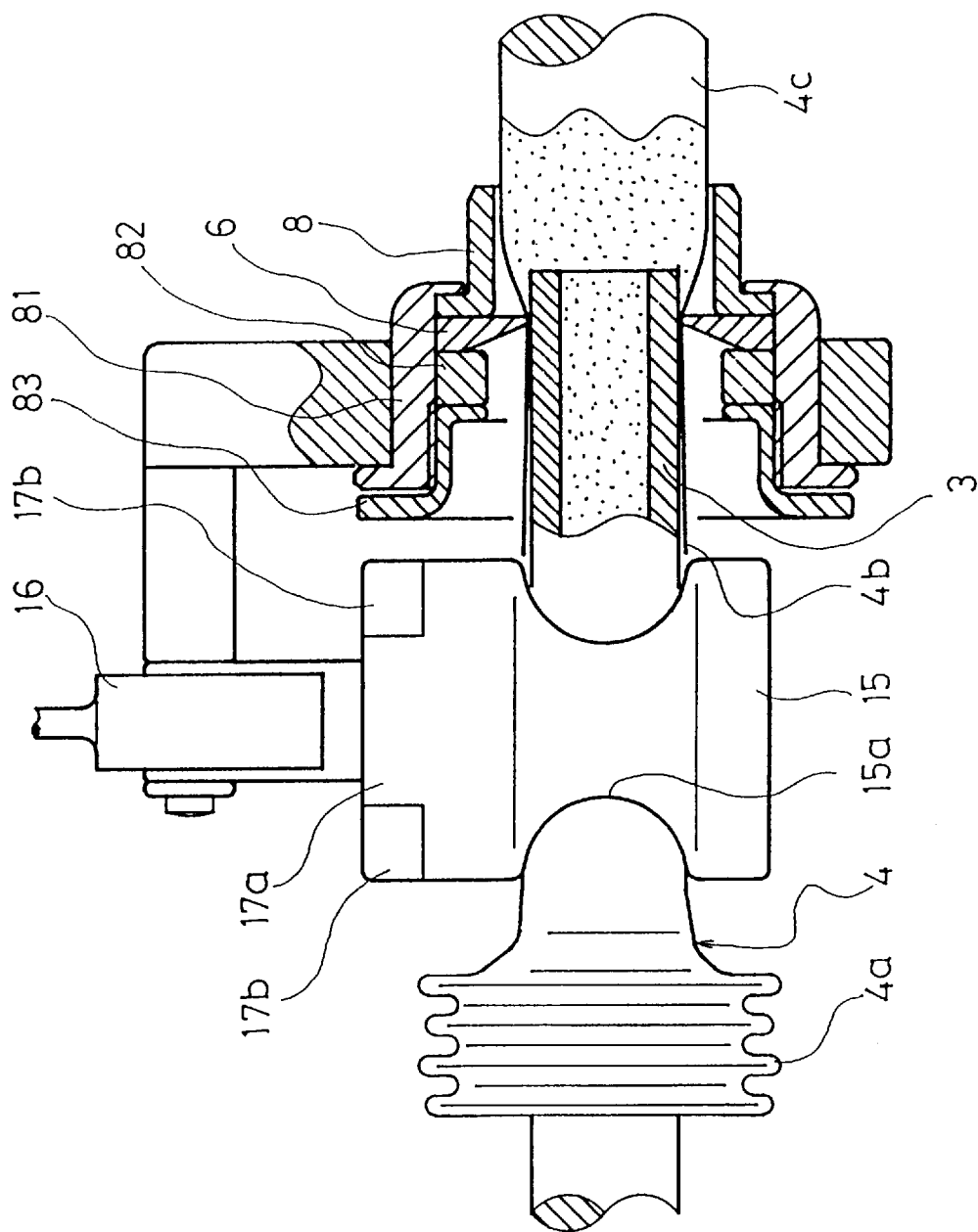
FIG. 6 is a plan view, with portions broken away and in section, of an example of a detecting device for detecting the rupture of a casing in accordance with the present invention.

Referring to FIG. 6, a description will be given hereafter of the resilient ring 6 in accordance with the embodiment of the present invention.

The resilient ring 6 is a doughnut-shaped ring formed of a resilient material such as rubber or a soft synthetic resin or the like. The resilient ring 6 is formed such that its thickness toward the opening portion in the center becomes gradually thin toward the central side thereof. The material of the resilient ring 6 serving as the hampering member may be a metal such as stainless steel insofar as it is capable of attaining the above-described action. In terms of its shape, the resilient ring 6 may have a differently shaped hole in which the opening portion (hole) in the center where the stuffing nozzle 3 is passed is shaped in the form of a star.

While the stuffing of the material to be stuffed into the casing 4 is being carried out, the stuffing nozzle 3 is disposed in such a manner as to be passed through the opening in the center of the resilient ring 6 (such that the tip of the stuffing nozzle 3 is passed through the resilient ring 6, and projects outside the same).

As described above, the functions of the resilient ring 6 are to stretch the creases or folds of the casing 4 which is shrunk or folded by two or more folds by being fitted over the stuffing nozzle 3, to pull the casing 4 out of the stuffing nozzle 3 in the non-shirred state, and to prevent the entrainment of air into the casing 4 through the gap between the stuffing nozzle 3 and the casing 4. Accordingly, the diameter of the opening at the center of the resilient ring 6 is set to be slightly larger than the outside diameter of the stuffing nozzle 3 (due to the braking force with respect to the feeding out of the casing 4), or is set to be equal to or slightly larger than the same (in which case, a range from 1 mm to 2 mm or thereabouts, for example, is preferable). If the diameter of the opening in the center of the resilient ring 6 is excessively larger than the outside diameter of the stuffing nozzle 3, there is the risk of air being entrained into the casing 4 and the material to be stuffed flowing reversely. On the other hand, if the diameter of the opening in the center of the resilient ring 6 is excessively smaller than the outside diameter of the stuffing nozzle 3, the pulling out of the casing 4 becomes difficult.

A fixing member 81 is fixed to the bracket 102, and a holding nut 83, a spacer 82, the resilient ring 6, and the guide member 8 are disposed in the fixing member 81. If the spacer 82 is replaced by a one having a different thickness after removing the holding nut 83, it is possible to change the number of resilient rings 6 which can be attached. Additionally, if the attaching position of the spacer 82 is changed from a forward to a backward position, or vice versa, with respect to the resilient ring 6, it is possible to change the position of the resilient ring 6.

The braking force with respect to the casing 4 which tends to be removed from the stuffing nozzle 3 also depends on the relative length of the non-shirred portion 4b of the casing 4. The braking force can also be adjusted by, for example, changing the amount of projection of the tip of the stuffing nozzle 3 from the resilient ring 6.

In the drawings, the non-shirred portion 4b is illustrated as being in a state in which the non-shirred portion 4b has a gap with the outer periphery of the stuffing nozzle 3 so as to facilitate viewing. In practice, however, the non-shirred portion 4b abuts against the outer periphery of the stuffing nozzle 3.

Hereafter, a description will be given of the suspending device 103.

As the suspending device 103, it is possible to use, for example, a known one disclosed in Japanese Pat. Application Laid-Open No. 146248/1993 or Japanese Patent Application Laid-Open No. 7073/1994. Here, referring to FIG. 11, a description will be given hereafter by using the suspending device having the same configuration as that of the embodiment disclosed in Japanese Pat. Application Laid-Open No. 146248/1993.

In the suspending device 103, a plurality of suspending members 203 are provided on an endlessly traveling member 201 which travels by being wound around and trained between two sprockets 202 disposed by being spaced apart from each other. A retaining position for retaining the stuffed casing 4c is determined such that a traveling passage of the suspending members 203 in a horizontal plane intersects with the passage of the stuffed casing 4c discharged from the guide member 104.

A signal-generating device 204 is provided for detecting the amount of movement of the conveying device 7 and for generating a signal of a value proportional to that amount of movement. The signal-generating device 204 is provided with a teeth-shaped member 205 provided on the conveying device 7 as well as a sensor 206 for detecting the amount of movement of the teeth-shaped member 205 and generating a pulse signal. A controlling device 207 for controlling the movement of the endlessly traveling member 201 is provided such that each time the amount of the stuffed casing 4c fed out from the conveying device 7 is set to a predetermined length on the basis of the signal from the sensor 206, the suspending members 203 are consecutively brought to the aforementioned retaining position, and the stuffed casings 4c are consecutively suspended by the suspending members 203 for each predetermined length. The conveying device 207 has a counter 208 which counts the number of pulses of the pulse signal generated by the signal-generating device 204, and generates an output signal for each number of pulses corresponding to the suspension length at which the stuffed casing 4c is suspended on one suspending member 203. The suspending device 103 is provided with a motor 209 and a clutch brake 210 so that the endlessly traveling member 201 of the suspending device 103 is started by an output signal from the counter 201, and is stopped by means of the controlling device 207 after traveling a predetermined distance.

Since the apparatus in accordance with this embodiment comprises the immobile guide member 104 and the suspending members 203 which operate intermittently in the horizontal plane, the apparatus has a highly reliable function even with respect to the straight stuffed casing 4c which is difficult to form a loop as compared with the linked stuffed casing.

A description will be given of the operation of the apparatus for straight-encasing sausages or the like and the suspending device in accordance with the present invention arranged as described above.

Figure 8:
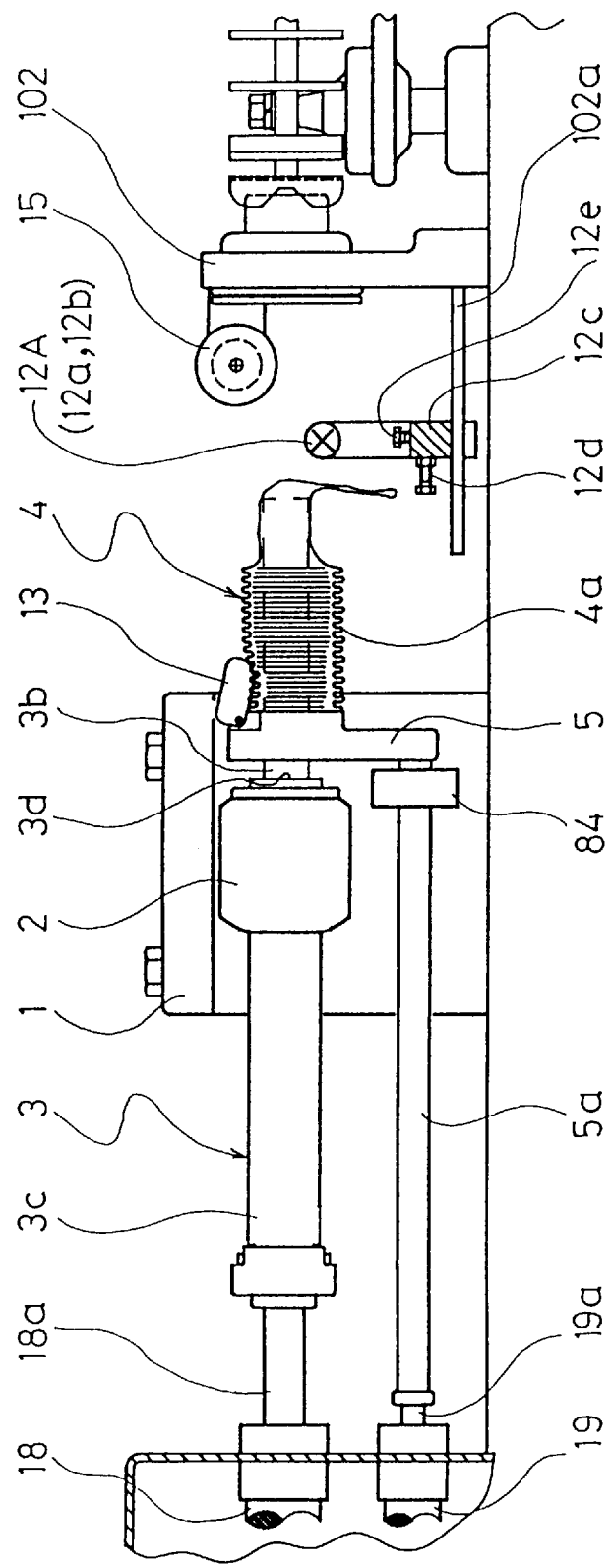
FIG. 8 is a front elevational view illustrating the operation of the apparatus for straight-encasing sausages or the like in accordance with the present invention, and illustrates a state before stuffing into the casing is carried out.

FIG. 8 shows a state before the material to be stuffed is stuffed into the casing 4. First, the casing 4 is fitted over the stuffing nozzle 3, and is pushed in until a rear end of the casing 4 is positioned at the positioning member 5. This operation is carried out manually. After the pressing member 13 is pushed upward by the casing 4, the pressing member 13 presses the shirred portion 4a of the casing 4 against the stuffing nozzle 3.

Next, the stuffing nozzle 3 is moved by the cylinder 18 to a predetermined position at which the tip of the stuffing nozzle 3 is passed through the resilient ring 6. (FIG. 2)

The positioning member 5 moves together with the stuffing nozzle 3 by being pressed by an end face 3d of the large-diameter portion 3c of the stuffing nozzle 3. After the movement of the stuffing nozzle 3 is stopped, the positioning member 5 is positioned by abutting against a stopper 12d formed by an adjustable screw member attached to the bracket 12c, as the rod 19a undergoes an extending operation due to the driving start of the cylinder 19. At this position, the shirred portion 4a of the trailing end of the casing 4 restricted by the positioning member 5 interrupts the optical axis P of the photosensor 12A.

The state in which the relevant members are thus moved is shown in FIGS. 2 and 3 already referred to.

Next, when the stuffing pump 1 is driven by the drive motor (not shown), the material to be stuffed is fed into the casing 4 through the stuffing block 2 and the stuffing nozzle 3. The stuffing nozzle 3 has two portions having large and small inside diameters, i.e., a casing-fitting portion and a stuffing-block inserted portion, and is capable of substantially reducing the in-pipe resistance with respect to the material to be stuffed which is pressured-fed inside the stuffing nozzle 3. Incidentally, the stuffing nozzle 3 may be formed as a single straight-shaped pipe in which the outside diameters of the casing-fitting portion and the stuffing-block inserted portion are set to an identical dimension. The casing 4c into which the material to be stuffed has been fed is delivered to the conveying device 7 via the guide member 8.

In the conveying device 7, the stuffed casing 4c delivered thereto is nipped and conveyed by the nipping plates 11, and is delivered to the suspending device 103 for the ensuing process via the guide member 104 so as to form a loop of a predetermined length.

Figure 11:
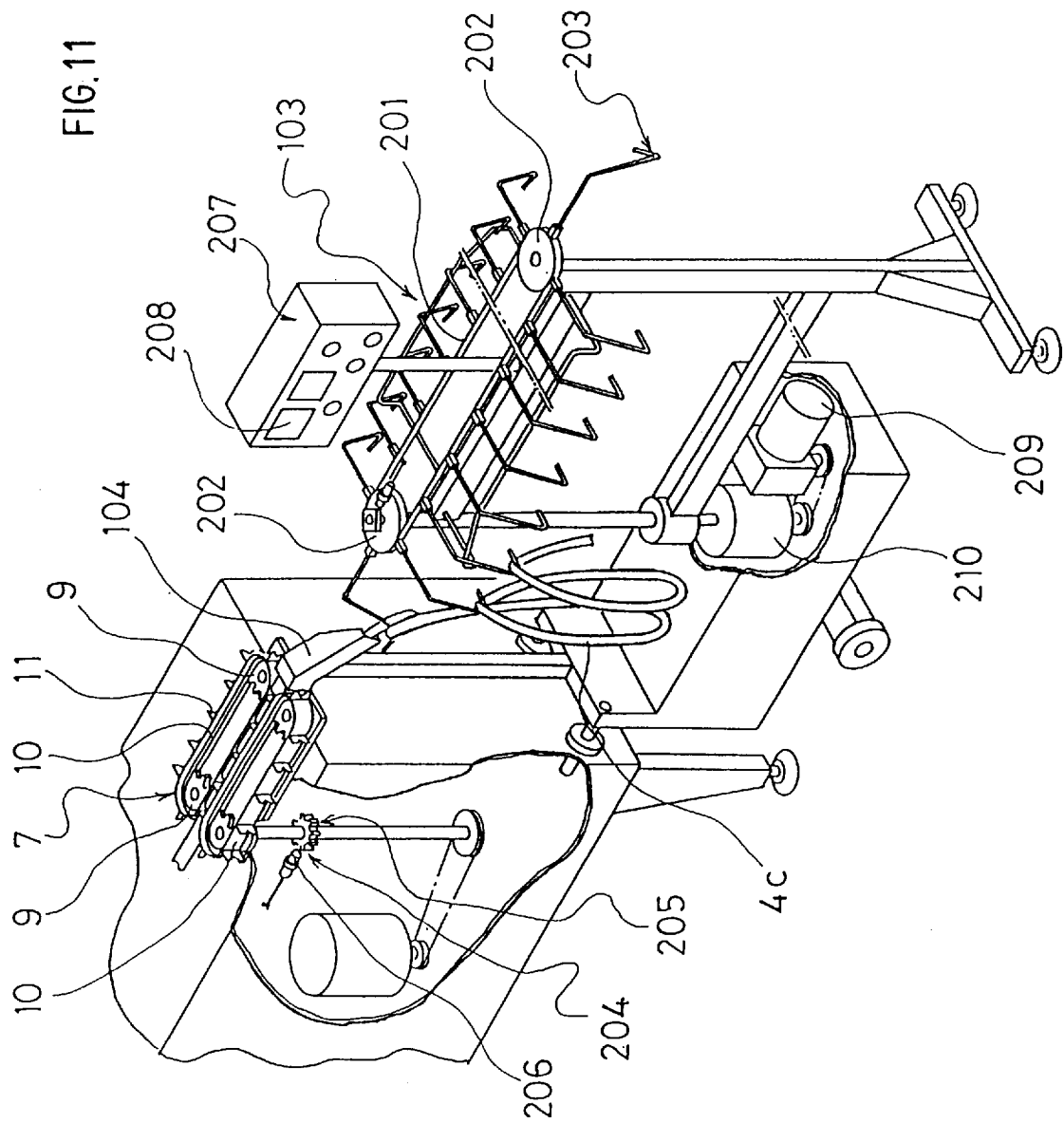
FIG. 11 is a perspective view illustrating a suspending device which is used in the present invention.

Referring to FIGS. 1 and 11, a description will be given of the operation of the suspending device 103.

In the conveying device 7, one of the sprockets 9 is rotated at a fixed speed so as to feed out the stuffed casing 4c, which is nipped by the nipping plates 11 attached to the chain 10, into the guide member 104. The signal-generating device 204 outputs a pulse signal proportional to the amount of rotation of the sprocket 9 to the counter 208 of the controlling device 207. The counter 208, in turn, issues an output signal for turning the clutch on to the clutch brake 210 for each predetermined number of input pulses. The suspending members 203 move by a predetermined rotational angle, and one of the suspending members 203 retains the stuffed casing 4c flowing out from the guide member 104, and is stopped at a predetermined position.

The above-described intermittent operation of the suspending members 203 is continued, so that loops of the straight stuffed casings 4c are formed on the plurality of suspending members 203.

Two sticks 106 are respectively passed through respective upper and lower portions of the loops of the straight stuffed casings 4c suspended in the form of loops in the suspending device 103. The stuffed casings 4c are removed from the suspending device 103 together with the sticks 106, and are transferred to undergo another process.

When the material to be stuffed is stuffed over the entire length of the casing 4, the shirred portion 4a of the casing 4 fitted over the stuffing nozzle 3 disappears.

Consequently, the light emitting from the light-projecting unit 12a reaches the light-receiving unit 12b. (For the light-projecting unit 12a and the light-receiving unit 12b, see FIGS. 1 and 3.)

Then, the stuffing pump 1 stops upon receiving a signal from the light-receiving unit 12b via the timer (not shown), so that the cylinder 18 and the cylinder 19 return to their original positions.

Next, a description will be given of the operation in which the stuffing pump 1 is stopped in the event that the casing 4 is ruptured during the stuffing of the material to be stuffed.

Figure 5:
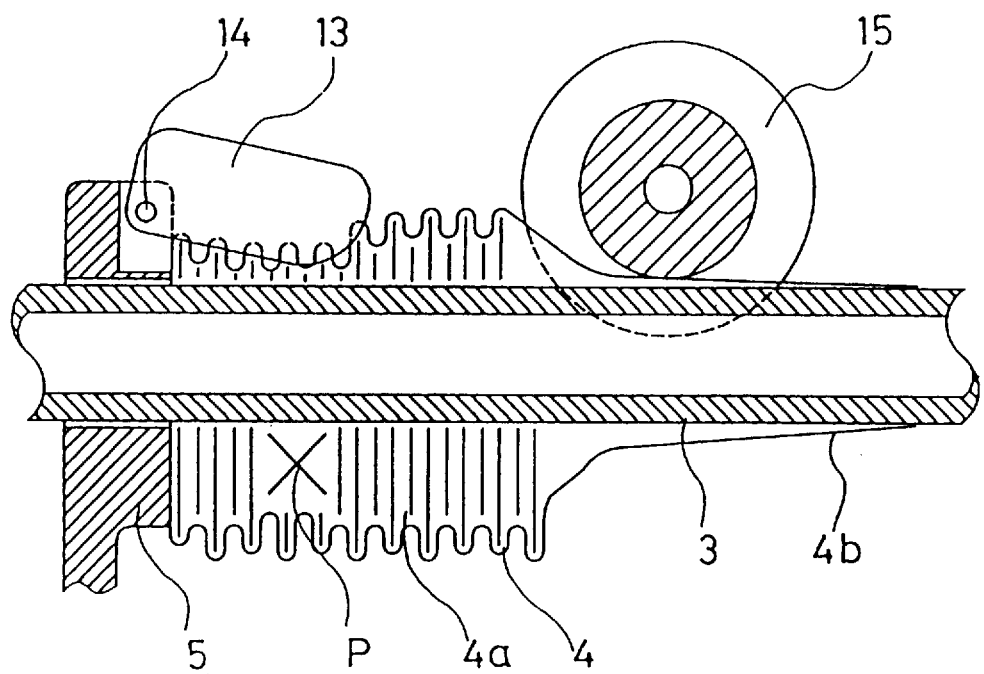
FIG. 5 is an enlarged cross-sectional view of a positioning member and its vicinity in accordance with the present invention.
Figure 7:
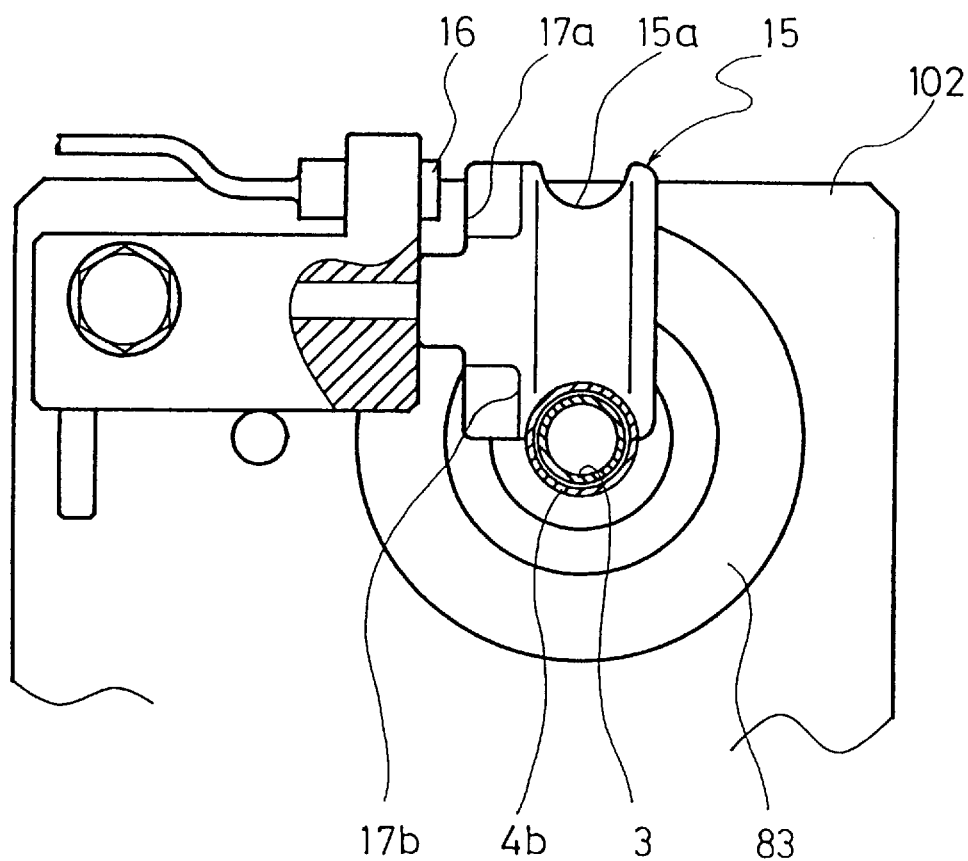
FIG. 7 is a side elevational view, with portions broken away, of the rupture-detecting device shown in FIG. 6.

Referring to FIGS. 5 to 7, when the material to be stuffed is being smoothly stuffed into the casing 4, the casing 4 moves in such a manner as to slide on the stuffing nozzle 3. The rotating roller 15 is rotated by the movement of the casing 4, and the rotation of the rotating roller 15 is detected by the sensor 16. Namely, the sensor 16 detects the rupture of the casing 4 by the presence or absence of a pulse signal which is generated by detecting a ridge 17a and a trough 17b provided on the rotating roller 15. When the casing 4 is ruptured, the rotating roller 15 does not rotate, with the result that the pulse signal becomes zero.

When the sensor 16 detects the stopping of the rotation of the rotating roller 15, the drive motor (not shown) of the stuffing pump 1 is stopped.

Incidentally, in the above-described embodiment, the arrangement provided is such that the positioning member 5 is moved by the cylinder 19 independently of the stuffing nozzle 3. The reason for this is that an optimum distance from the tip of the stuffing nozzle 3 to the position where the positioning member 5 is disposed may be different at the time when the casing 4 is fitted over the stuffing nozzle 3 and at the time when the material to be stuffed is stuffed into the casing 4, respectively. In this case, the distance during the fitting process is generally larger than the distance during the stuffing process. Therefore, the positioning member 5 is adapted to move to the predetermined position of the stuffing nozzle 3 together with the stuffing nozzle 3, and to move to a predetermined position of the positioning member 5 independently even after the stopping of the stuffing nozzle 3. The predetermined position of the positioning member 5 during the stuffing process may be different depending on the type and length of the casing. To change this predetermined position, i.e., the position of the end of the casing 4, it suffices to change the position of the bracket 12c where the stopper 12d for restricting the position of the positioning member 5 is provided uprightly. Even if the position of the bracket 12c is adjusted, since the light-projecting unit 12a and the light-receiving unit 12b are attached to the bracket 12c, the distance between the end of the casing 4 and the optical axis P can be maintained at a fixed distance.

Figure 9:
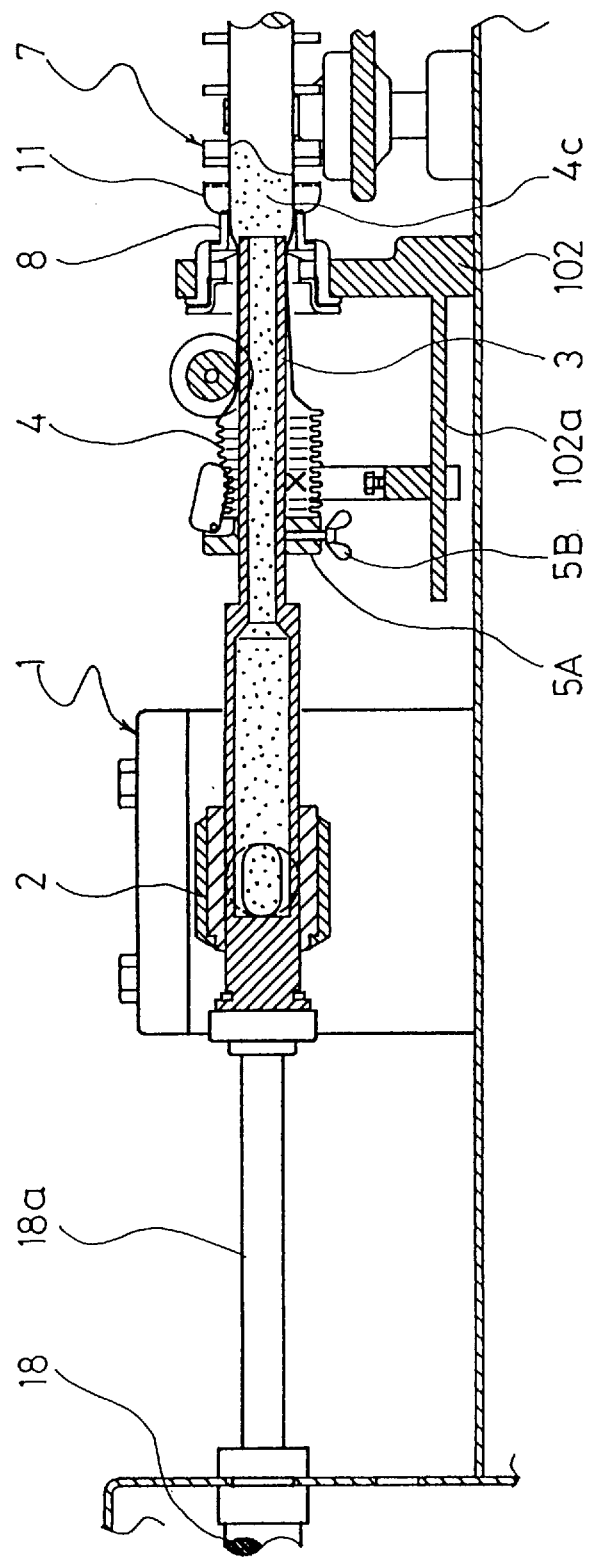
FIG. 9 is a front elevational view, with portions broken away and in section, of another example of the positioning member in accordance with the present invention.
Figure 10:
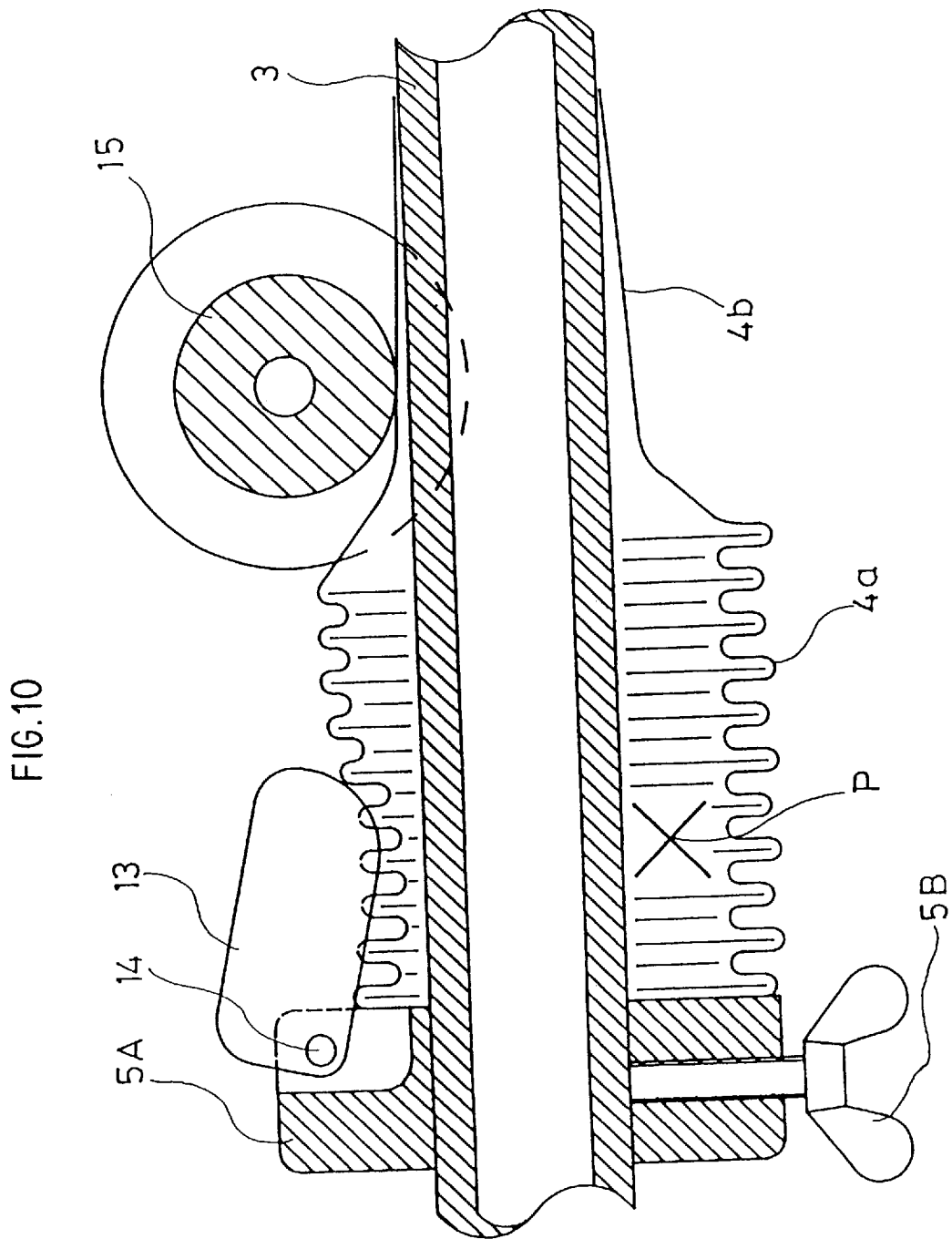
FIG. 10 is an enlarged cross-sectional view of the positioning member shown in FIG. 9.

In addition, the positioning member in the present invention is not limited to that of the above-described embodiment. For example, in a case where the optimum distance from the tip of the stuffing nozzle 3 to the position where the positioning member 5 is disposed is the same at the time when the casing 4 is fitted over the stuffing nozzle 3 and at the time when the material to be stuffed is stuffed into the casing 4, an arrangement may be provided such that, as shown in FIGS. 9 and 10, a positioning member 5A is fitted on the stuffing nozzle 3, and is secured to the stuffing nozzle 3 by means of a setscrew 5B. In this case, the mounting position of the positioning member 5A can be changed to an appropriate position by loosening the setscrew 5B and moving the positioning member 5A on the stuffing nozzle 3. In this example, the cylinder for moving the positioning member 5A is not required, thereby making it possible to simplify the apparatus.

In addition to the above-described embodiment, the present invention includes embodiments which are described below.

Namely, although in the above-described embodiment the stuffing nozzle 3 is reciprocated back and forth, the stuffing nozzle 3 in the apparatus may not be movable back and forth. This embodiment has a structure which is particularly suitable for using natural gut casings, but the use of artificial casings is not excluded.

Figure 12:
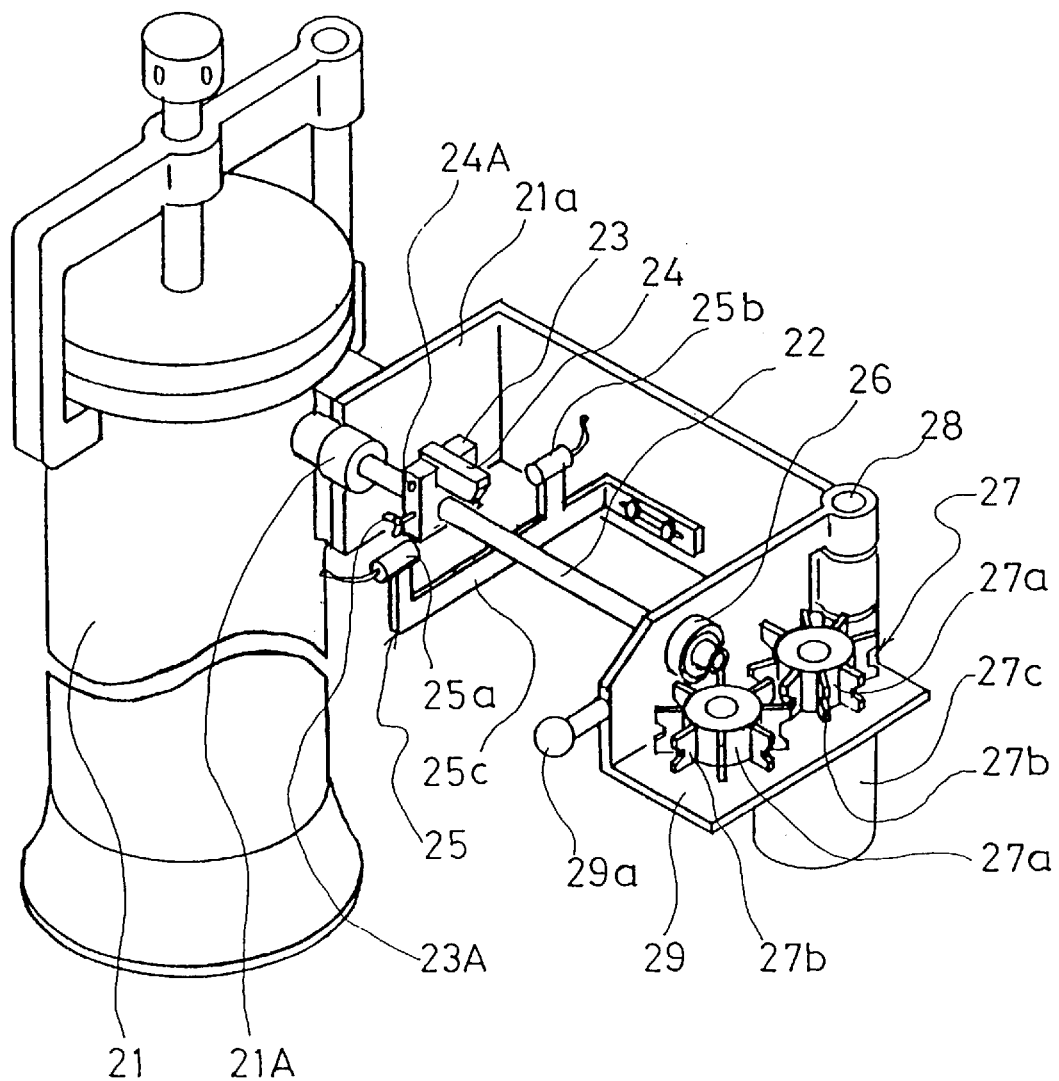
FIG. 12 is a perspective view illustrating an apparatus for straight-encasing sausages or the like in accordance with another embodiment of the present invention.

Referring to FIGS. 12, 13A, and 13B, the structure provided is such that a stuffing nozzle 22 is directly fixed to an electrically-operated opening/closing valve 21A which is attached to an outlet portion of a known piston-type stuffer 21 in which a material to be stuffed is accommodated, and the material to be stuffed pressurized by the stuffer 21 is introduced into the stuffing nozzle 22. A positioning member 23 is fixed to the stuffing nozzle 22 by means of a bolt 23A in such a way that the position of the positioning member 23 is adjustable. A pressing member 24 is provided on the positioning member 23 with a hinge 24A serving as a fulcrum. Since the structure of the pressing member 24 is similar to that of the pressure member 13 in the above-described embodiment, a description thereof will be omitted. A detecting means 25 comprised of a light-projecting unit 25a, a light-receiving unit 25b, and a bracket 25c is provided for detecting the completion of stuffing by detecting a change in the form of the trailing end of the casing. The opening/closing valve 21A is closed by the detection signal from the detecting means 25 for detecting the completion of stuffing, so as to end the stuffing into the casing. Since the operation concerning the detection by the detecting means 25 is similar to that in the above-described embodiment, a description thereof will be omitted.

This embodiment is characterized in that although the stuffing nozzle 3 is arranged to be movable in the above-described embodiment, the stuffing nozzle 22 is fixed and a resilient ring 26 serving as a hampering member is movable in this embodiment, and in that although the conveying device is constituted by the endlessly traveling member in the above-described embodiment, a conveying device 27 is constituted by a pair of rotating members in this embodiment.

Namely, the resilient ring 26 and the conveying device 27 are provided on an opening/closing member 29 which is opened and closed by a hinge 28. The hinge 28 is provided on a frame 21a which is secured to the cylinder of the stuffer 21, and the bracket 25c of the aforementioned detecting means 25 is also attached to the frame 21a in such a manner as to be adjustable in the longitudinal direction of the stuffing nozzle 22. The arrangement provided is such that the casing is fitted by opening the opening/closing member 29 by means of a manual handle 29a, the opening/closing valve 21A is opened and the conveying device 27 is concurrently started by means of a detection signal from the unillustrated detecting means for detecting the closed state of the opening/closing member 29, so as to effect the stuffing of the material to be stuffed into the casing 4.

Referring to FIGS. 13A and 13B, the resilient ring 26 is sufficient if it is provided with the same structure of an attaching portion as that of the resilient ring 6 in the above-described embodiment (FIG. 6). The conveying device 27 is comprised of a pair of cylindrical rotating members 27a, a plurality of nipping members 27b attached thereto, and a motor 27c for driving both of the pair of rotating members 27a. The conveying device 27 is similar to the conveying device 7 of the above-described embodiment in that the conveying device 27 pulls the casing out of the stuffing nozzle 22 by nipping the stuffed casing 4c. When an artificial casing us used, it suffices if the positioning member 23, the pressing member 24, and the detecting means 25 are removed from the apparatus.

In the encasing apparatus using the stuffer shown in FIG. 12, the structure provided is such that the positioning member is fixed at a predetermined position to press the trailing end of the casing, and the completion of the stuffing is detected by detecting the presence or absence of the trailing end. However, the apparatus of the present invention may be arranged as shown in FIGS. 14 and 15.

Namely, a positioning member 112 is slidably fitted on a stuffing nozzle 111. A spring 113 for urging the positioning member 112 in such a manner as to move the positioning member 112 toward the tip of the stuffing nozzle 111 is fitted over the stuffing nozzle 111. In this embodiment, a detecting means 115 for detecting a trailing end of a casing 114 is provided in an immediate vicinity of the resilient ring 26 serving as the hampering member. In addition, a conveying device 116 is constituted by a pair of flat endless belts arranged in face-to-face relation to each other. A stopper 117 for determining a forward moving end of the positioning member 112 is attached to a fixed wall 118. The detecting means 115 and the stopper 117 can be attached in such a way that their positions are adjustable.

In accordance with the above-described embodiment, the position of the trailing end of the casing 114 gradually moves toward the tip of the stuffing nozzle 111 during the stuffing operation, and the positioning member 112 stops at the position where the positioning member 112 abuts against the stopper 117. At this position, the presence or absence of the trailing end of the casing 114 is detected, so as to detect the completion of the stuffing. In this embodiment, an arrangement may be provided such that a known linking device 119 is disposed downstream of the conveying device 16. If the conveyance of the stuffed casing in the conveying device 116 and the conveyance of the stuffed casing in the linking device 119 are synchronized, it is possible to obtain an automatic linking system for processing the straight stuffed casing 4c into a linked stuffed casing 4L.

Figure 14:
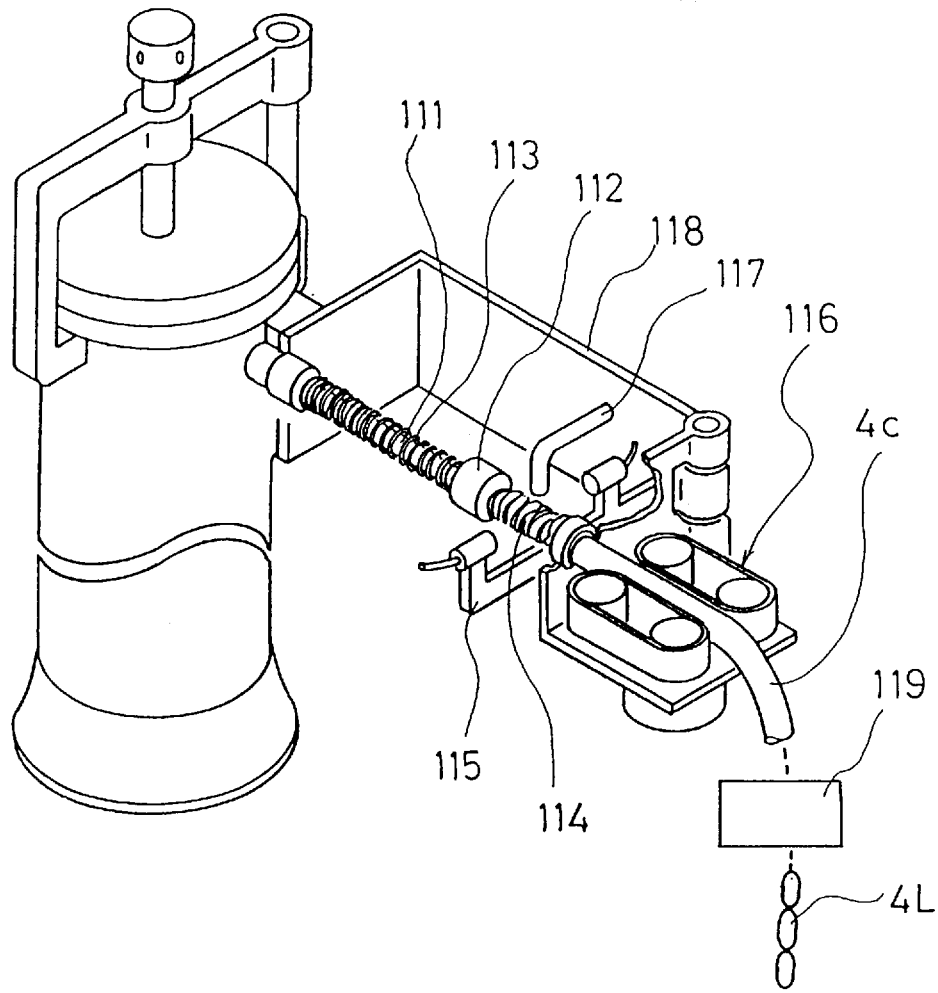
FIG. 14 is a perspective view illustrating an apparatus for straight-encasing sausages or the like in accordance with still another embodiment of the present invention.
Figure 15:
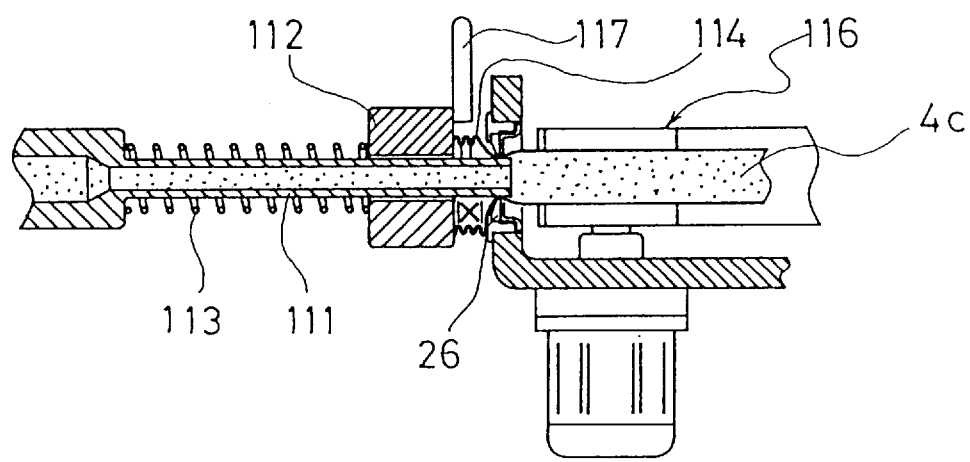
FIG. 15 is an enlarged cross-sectional view of the stuffing nozzle and its vicinity shown in FIG. 14.

Incidentally, in the structure shown in FIGS. 14 and 15, an arrangement may be provided such that, instead of the spring 113, the positioning member 112 is advanced in steps by using a known electrically-operated actuator.

The means for pressurizing the raw material in the two embodiments in which the stuffing nozzle does not move is illustrated as being a hydraulic or pneumatic stuffer, but various pressurizing means including a known vane pump may be used as the means for pressurizing the raw material.

Instead of the resilient ring 6 serving as the hampering member in the embodiment shown in FIGS. 1 to 10 and the resilient ring 26 serving as the hampering member in the embodiment shown in FIGS. 12 and 13 and in the embodiment shown in FIGS. 14 and 15, it is possible to use a chuck 127 which will be described later. In this case, the state in which the tip of the stuffing nozzle 3 is inserted in the chuck 127 can be arranged as shown in either FIG. 17 or 18. Further, the resilient member 6 or 26 can be used jointly with the chuck 127, although the combination thereof is not shown.

Hereafter, a description will be given of the apparatus for straight-encasing sausages or the like which is suitable for the use of shirred artificial casings, such as collagen casings.

Figure 16:
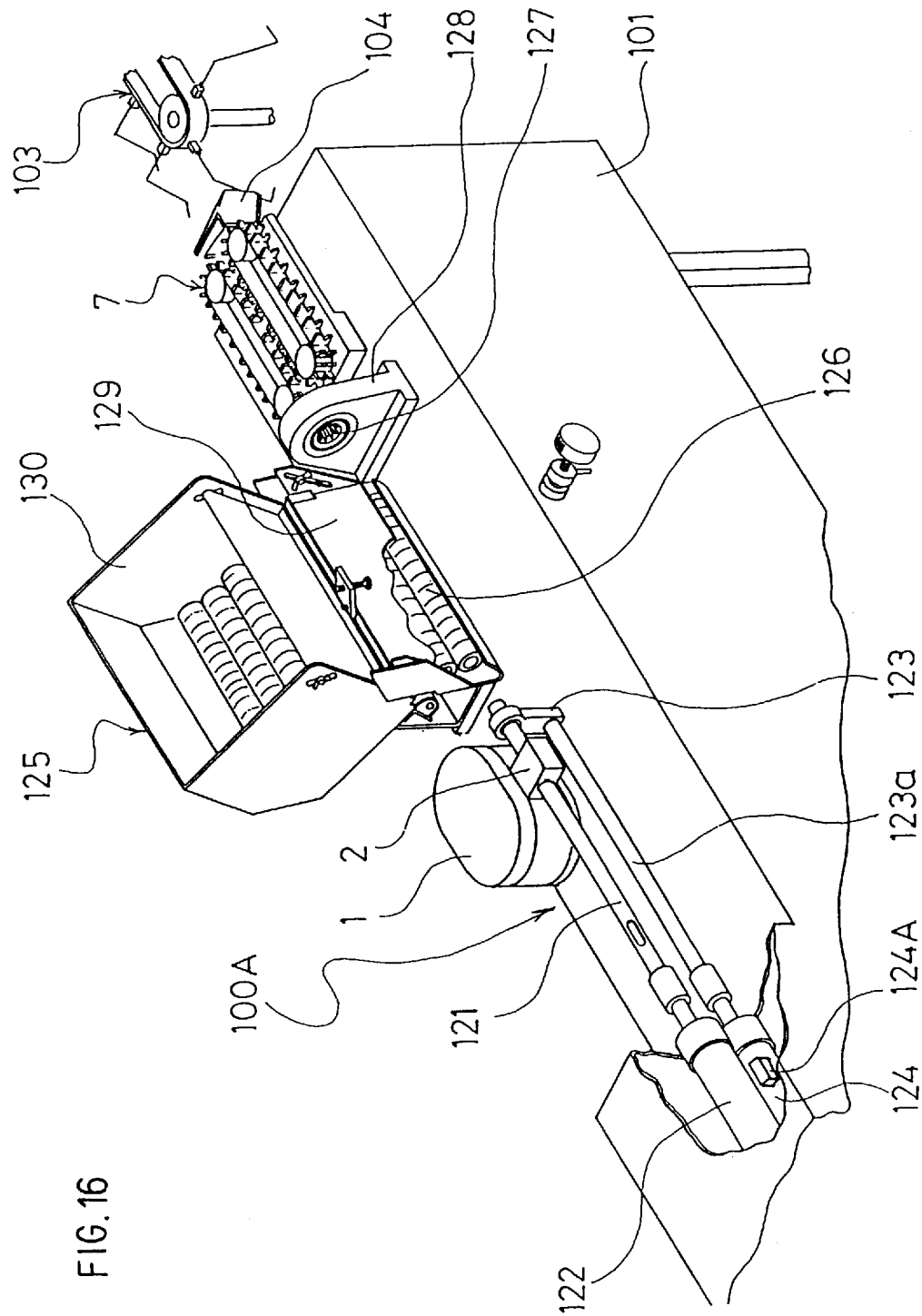
FIG. 16 is a perspective view illustrating a state in which a device for automatically supplying artificial casings is used for the apparatus for encasing sausages or the like in accordance with the present invention.
Figure 17:
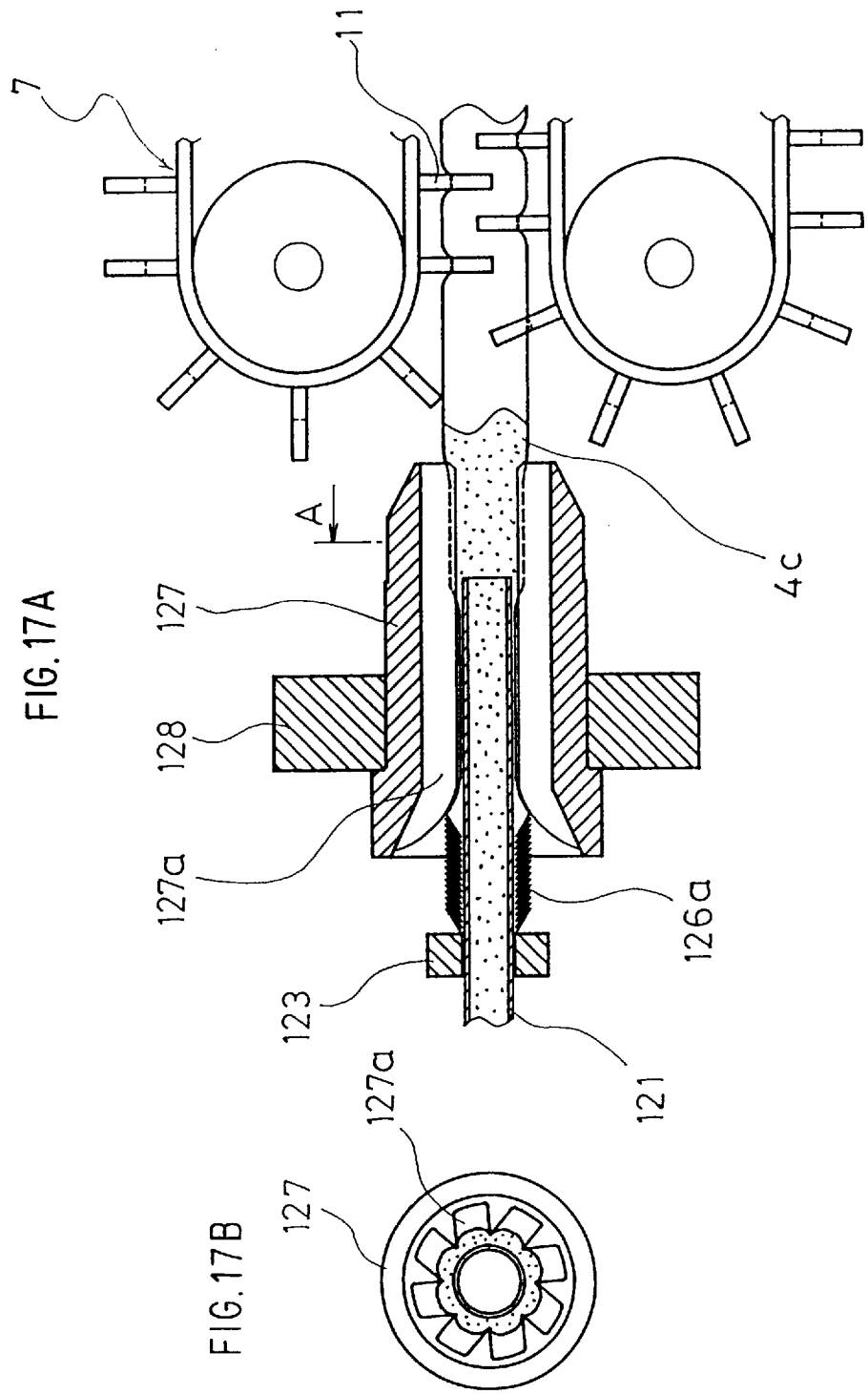
FIG. 17A is a top plan view, with portions broken away and in section, of an apparatus for straight-encasing sausages or the like in accordance with a further embodiment of the present invention.
FIG. 17B is a vertical cross-sectional view of a section A shown in FIG. 17A.
Figure 18:
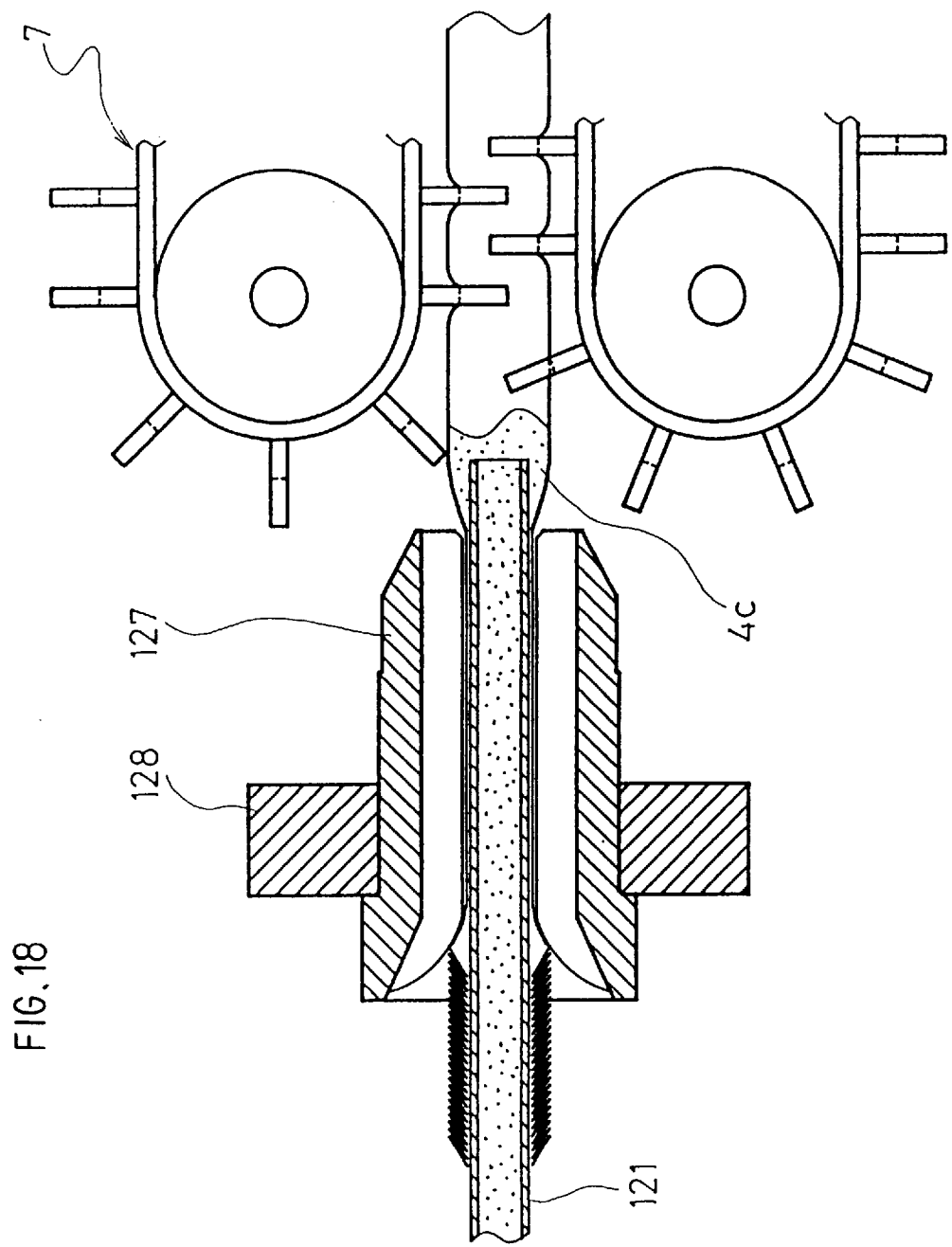
FIG. 18 is a top plan view, with portions broken away and in section, of an apparatus for straight-encasing sausages or the like in accordance with a further embodiment of the present invention.

Referring to FIGS. 16 to 18, numeral 100A denotes an apparatus for straight-encasing sausages or the like, numeral 1 denotes the stuffing pump, and 2 denotes the stuffing block in the same way as in the above-described first embodiment. Numeral 121 denotes a stuffing nozzle having the shape of a single straight pipe, and the stuffing nozzle 121 is moved back and forth by a cylinder 122. A casing pusher 123 serving as a positioning member is provided in such a manner as to be movable back and forth by a cylinder 124. Numeral 125 denotes an automatic casing-supplying device for an artificial casing 126. The chuck 127 serving as the hampering member is fitted in a housing 128 adjacent to the automatic casing-supplying device 125. A splined hole 127a is formed penetratingly in the center of the chuck 127 for applying a brake to the casing 126.

In addition, the same conveying device 7 as that of the first embodiment is provided.

Here, the chuck 127 can be substituted by the aforementioned resilient ring 6 or 26. Further, the chuck 127 may be used jointly with the resilient ring 6 or 26, although the combination thereof is not illustrated.

A description will be given of the structure of the automatic casing-supplying device 125. A casing supplying member 129 for holding the casing 126 and allowing the stuffing nozzle 121 to be fitted into the casing 126 is disposed at a position to which the stuffing nozzle 121 is extended. As the casing supplying member 129 swings, the casing supplying member 129 positions the casing 126 to an appropriate position.

The casing supplying member 129 is swingably attached to a box 130 in which the multiplicity of casings 126 are accommodated. Incidentally, as this automatic casing supplying device, it is possible to use the device disclosed in Japanese Patent Application Laid-Open No. 269618/1990.

A description will be given of the operation of the apparatus for straight-encasing artificial casings which is constructed as described above.

The casing supplying member 129 is swung upwardly, and the casing 126 held in the casing supplying member 129 is moved to the position of the height of the center of the stuffing nozzle 121. The stuffing nozzle 121 is extended by the cylinder 122, with the result that the stuffing nozzle 121 is automatically inserted into the casing 126. Then, the casing supplying member 129 is swung downwardly, and after the casing 126 is fitted over the stuffing nozzle 121 is completed, the normal stuffing operation is carried out.

Referring to FIGS. 17A and 17B, during the stuffing operation the tip of the stuffing nozzle 121 is inserted to the interior of the chuck 127. The artificial casing 126 is pushed and advanced by the casing pusher 123 up to a position where a shirred portion 126a thereof abuts against a tapered introducing portion of the chuck 127. The portion of the stuffed casing 4c is engaged with the splined hole 127a in the chuck 127. For this reason, brakes are applied to the artificial casing 126 by the abutting portion and the engaging portion. The artificial casing 4c stuffed with the material to be stuffed is pulled out by the conveying device 7, and is nipped by the nipping plates, so that the artificial casing 4c can be pulled out smoothly without slipping.

The casing pusher 123 advances forward with a reduction in the amount of the shirred portion 126a, and reaches a predetermined position, whereupon a detecting means 124A for detecting the position of the casing pusher 123 issues a detection signal to complete the stuffing. Thus, in the apparatus of this embodiment, it is possible to effect fully automatic straight stuffing using the artificial casing.

In the embodiment shown in FIGS. 17A and 17B, the tip of the stuffing nozzle is located inside the chuck. However, as shown in FIG. 18, the tip of the stuffing nozzle 121 may be inserted through the chuck 127 and extended outside the chuck 127.

In accordance with the above-described structure, the amount of air being entrained into the interior of the stuffed casing 4c is reduced, and a high-quality product can be obtained.

Next, referring to FIG. 19, a description will be given of a loop-cutting device of the straight-encasing apparatus in accordance with a further embodiment of the present invention.

In the drawing, reference numeral 103A denotes another suspending device which can be used instead of the above-described suspending device 103. Its structure is basically similar to that of the suspending device 103, and the movement of an endlessly traveling member 301 of the suspending device 103A is controlled by a signal-generating device 308 and a controlling device 309.

A loop guide 303 serving as a rod member which is a part of a loop-cutting device 302 is disposed on the side of the endlessly traveling member 301 of the suspending device 103A in parallel with the moving direction of suspending members 304.

A cutting means 306, which is a part of the loop-cutting deice 302, is disposed below the loop guide 303 of a base 305 and in parallel with the loop guide 303. The cutting means 306 is comprised of an upper cutter 306a, a cylinder 306b for swinging the cutter 306a, and a lower cutter 306c disposed in a fixed manner.

A loop-expanding means 307 is provided on the base 305. The loop-expanding means 307 is comprised of a motor 307a, a rotating arm 307b rotated intermittently by the motor 307a, and a sensor 307c for detecting the rotating angle of the rotating arm so as to control the rotation of the rotating arm 307b for each predetermined angle (e.g., 180°). The loop-extending means 307 is operatively connected to a control means 309 so as to by synchronized with the movement of the endlessly traveling member 301. The motor 307a is started by a signal representing the stop of the suspending members 304 from a sensor 310, and is stopped by a signal from the sensor 307c.

A description will now be given of the operation of the loop-cutting device for cutting the straight-stuffed casing in accordance with this embodiment of the present invention constructed as described above.

Figure 19:
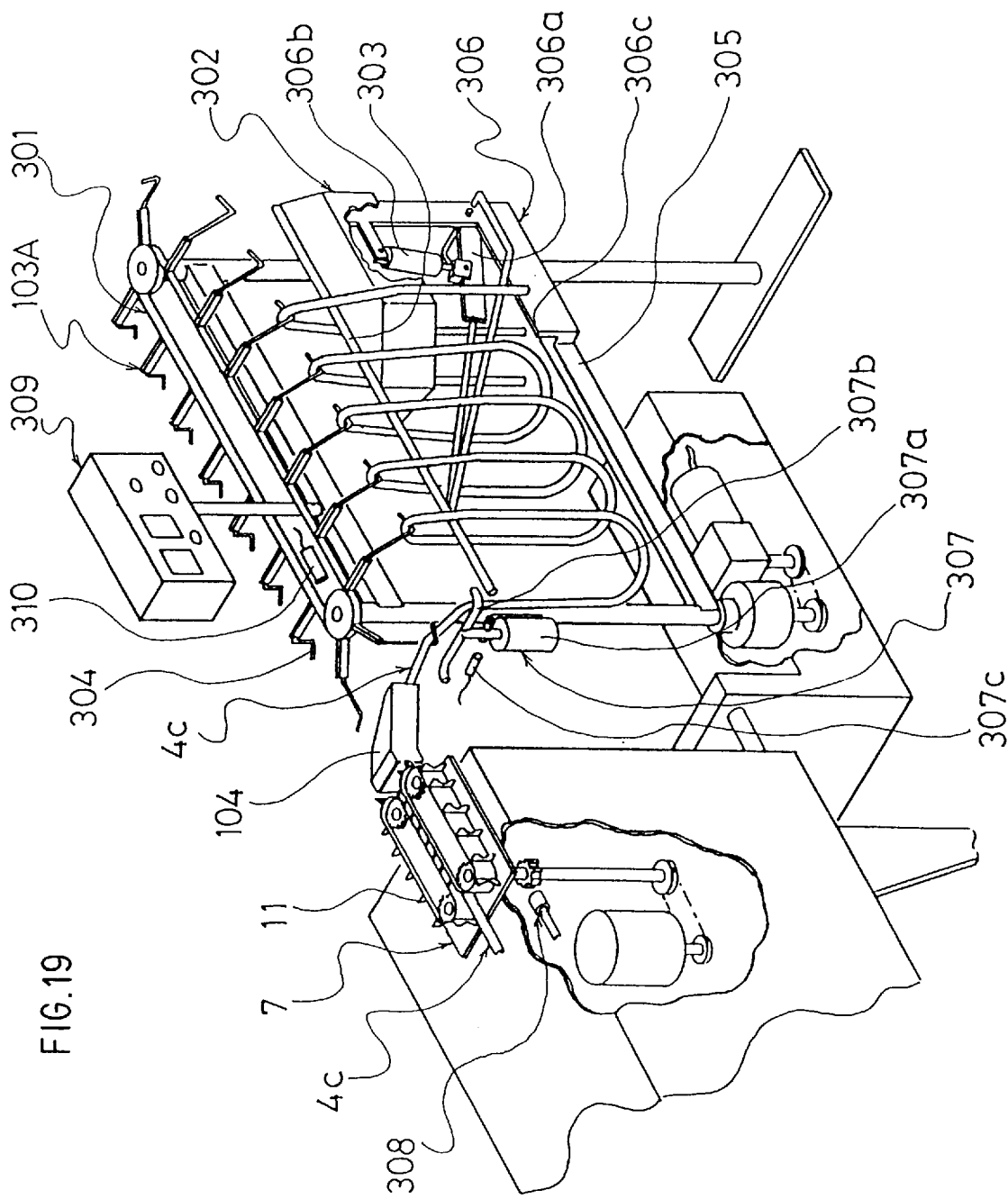
FIG. 19 is a perspective view illustrating a cutting device for cutting a straight-stuffed product having loops into which a stick is passed.
Figure 20A:
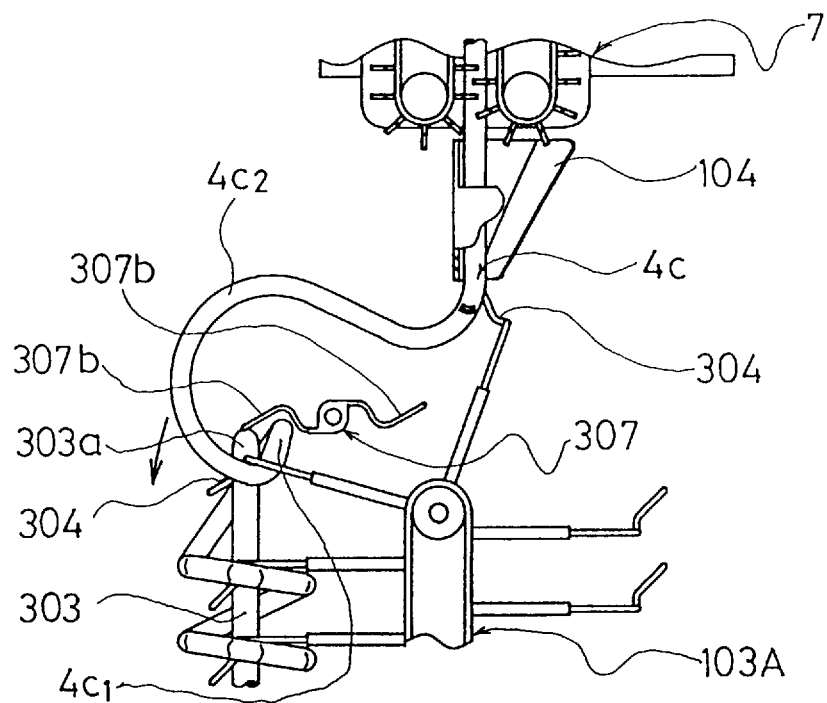
FIG. 20A is a plan view illustrating the operation of a loop-expanding means shown in FIG. 19.
Figure 20B:
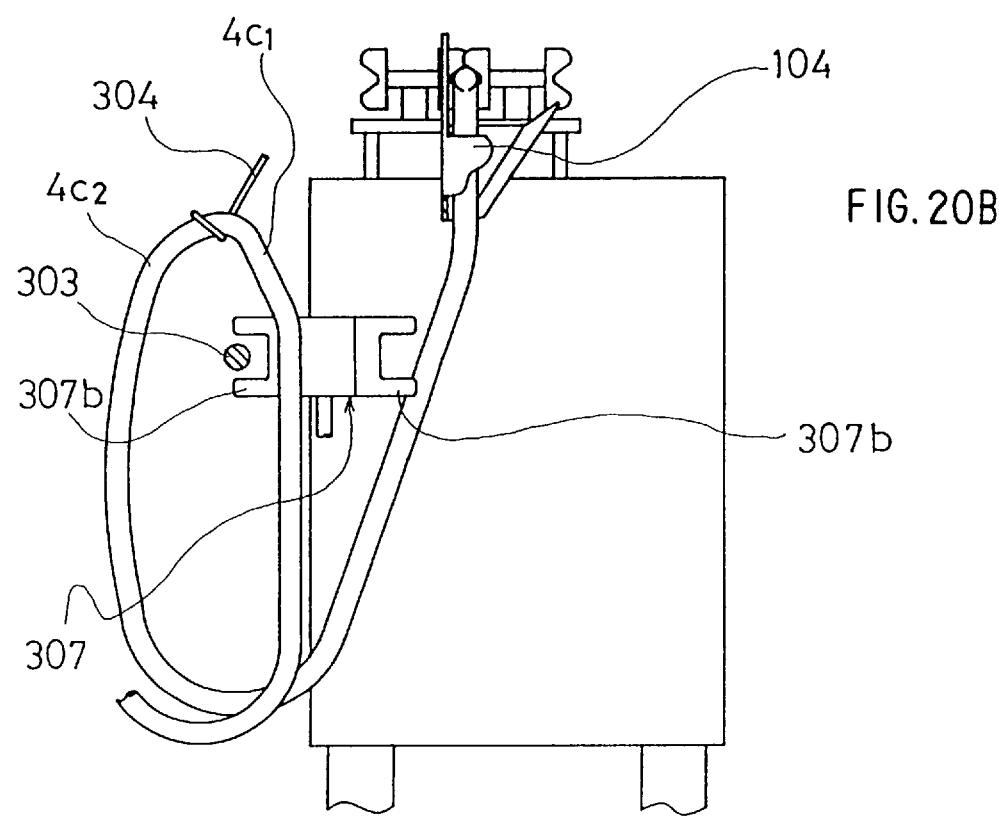
FIG. 20B is a side elevational view illustrating the operation of the loop-expanding means shown in FIG. 19.

Referring to FIGS. 19, 20A, and 20B, when the conveying device 7 is moved by a predetermined amount, the suspending members 304 start to rotate and move intermittently, and one of the suspending members 304 stops at a predetermined position after retaining the straight-stuffed casing 4c discharged from the guide member 104. Then, the loop-expanding means 307 which was stopped at a predetermined position starts to rotate and move intermittently, and during its movement the rotating arm 307b of the loop-expanding means 307 is engaged with a portion $4c_1$ of the straight-stuffed casing 4c which is suspended from the suspending member 304 by a predetermined length. The rotating arm 307b, which continued to move to a predetermined position, stops so as to hold and position the portion $4c_1$ on the inner side of an end 303a of the loop guide 303. When the intermittent rotation and movement of an ensuing cycle of the suspending member 304 is started, a portion $4c_2$ of the straight-stuffed casing 4c is swung to the outer side of the end 303a of the loop guide 303 owing to a centrifugal force caused by the suspending member 304. Consequently, the end 303a of the loop guide 303 is inserted into the loop of the straight-stuffed casing 4c suspended from the suspending member 304. As the mutual cyclic movement of the suspending member 304 and the loop-expanding means 307 is repeated, the straight-stuffed casing 4c suspended in the form of loops from the suspending members 304 is consecutively sent toward the cutting means 306 while being guided by the loop guide 303, and lower portions of the loops are nipped and positioned between the upper cutter 306a and the lower cutter 306c. In this state, the cylinder 306b is actuated, so that the suspended lower portions of the straight-stuffed casing 4c are cut.

An unillustrated stick for heat treatment is manually inserted into the suspended portions of the straight-stuffed casing 4c which are cut for each loop, and the stick is manually lifted to carry the cut stuffed casing 4c thereon, and is subsequently transferred for an ensuing process.

In the above-described embodiment, the loop-cutting device and the loop expanding means are jointly provided in the suspending device. In accordance with a further embodiment of the present invention, the loop-cutting device is not provided, but a device for inserting a stick into the loops is included.

Figure 21:
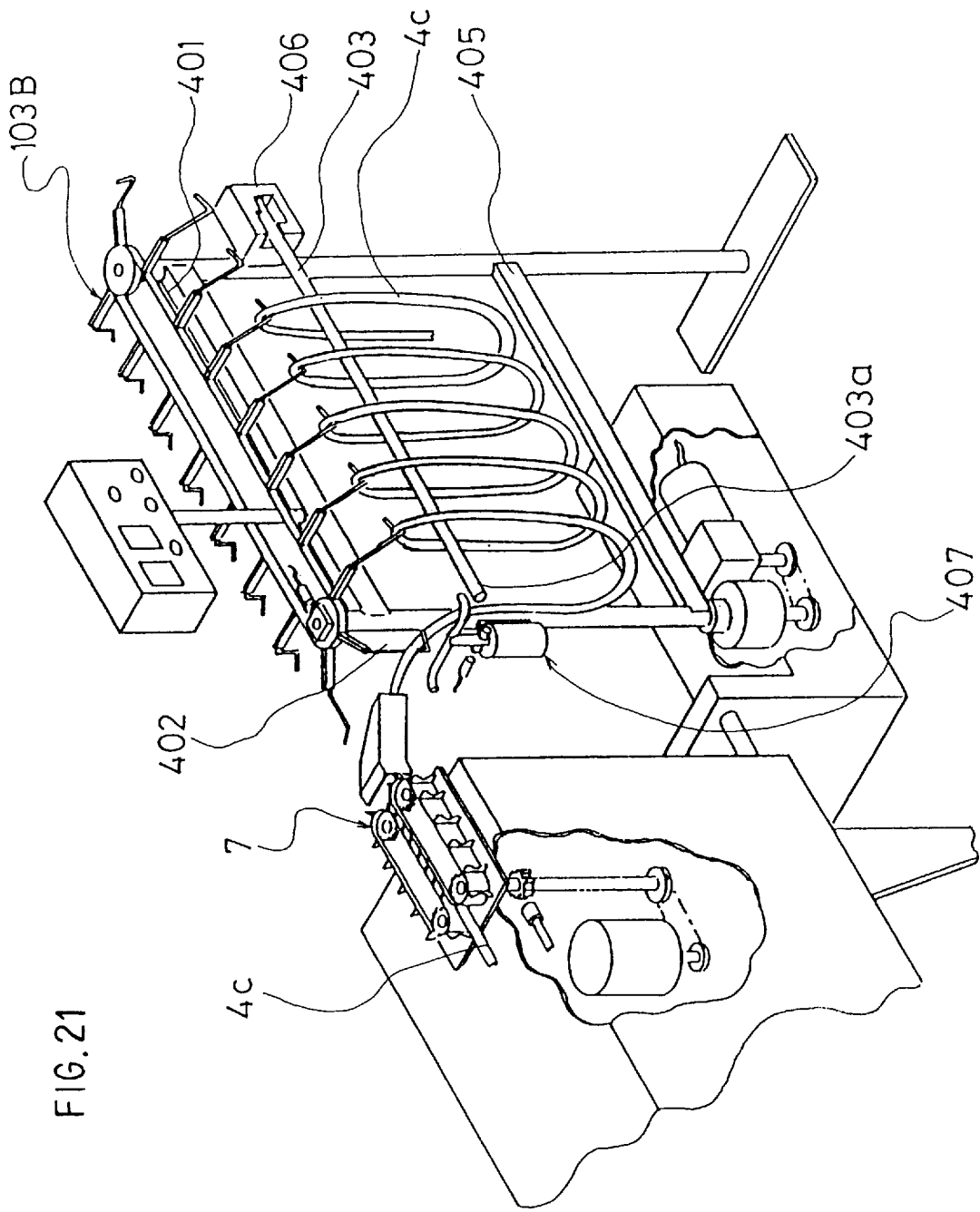
FIG. 21 is a perspective view illustrating an embodiment in which a stick inserted into the loops of the stuffed casing is made removable.

Referring to FIG. 21, a stick 403 is disposed at a position below a plurality of suspending members 402 provided on an endlessly traveling member 401 of a suspending device 103B. The stick 403 can be easily attached or detached by means of a stick-supporting means 406 provided on a base 405. The base 405 is provided with a loop-expanding means 407 for facilitating the insertion of an end 403a of the stick 403 into the loops. The other arrangements are similar to those of the foregoing embodiment.

Next, a description will be given of the operation of the embodiment shown in FIG. 21.

One straight-stuffed casing 4c fed out from the conveying device 7 is suspended in loops for each predetermined length on the suspending members 402. Upon completion of the suspension, the insertion of the stick 403 into the continuous loops of the stuffed casing 4c is also completed. This operation is similar to that of the above-described embodiments.

In this embodiment, the manual insertion of the stick into the loops is not required. After the automatic insertion of the stick into the loops is completed, the stick 403 is removed from the stick-supporting means 406, and the stuffed casing 4c together with the stick 403 is moved to a heat treatment chamber.

In the above, a description has been given of embodiments for making the stuffing diameter uniform. Hereafter, a description will be given of an automatic encasing apparatus for manufacturing nonuniform-stuffing-diameter products in which a material to be stuffed is stuffed by an appropriate amount into a natural gut casing whose outside diameter differs substantially in various portions in the longitudinal direction thereof, and more particularly of its controlling device.

In the case of natural gut casings such as sheep's guts and hog's buts (hereafter referred to as the casings), the outside diameter of the casings changes appreciably, and the strength is not fixed. Accordingly, if the rate of discharge from the stuffing nozzle is set to an identical rate of discharge at a fixed casing-conveying speed, the material to be stuffed is stuffed with varying stuffing degrees. That is, a sausage in which hard portions and soft portions are mixed is obtained.

Accordingly, there are cases where it is necessary to control the stuffing degree such that the casing is stuffed with the same stuffing degree while constantly monitoring the casing being stuffed with the material to be stuffed.

Figure 22:
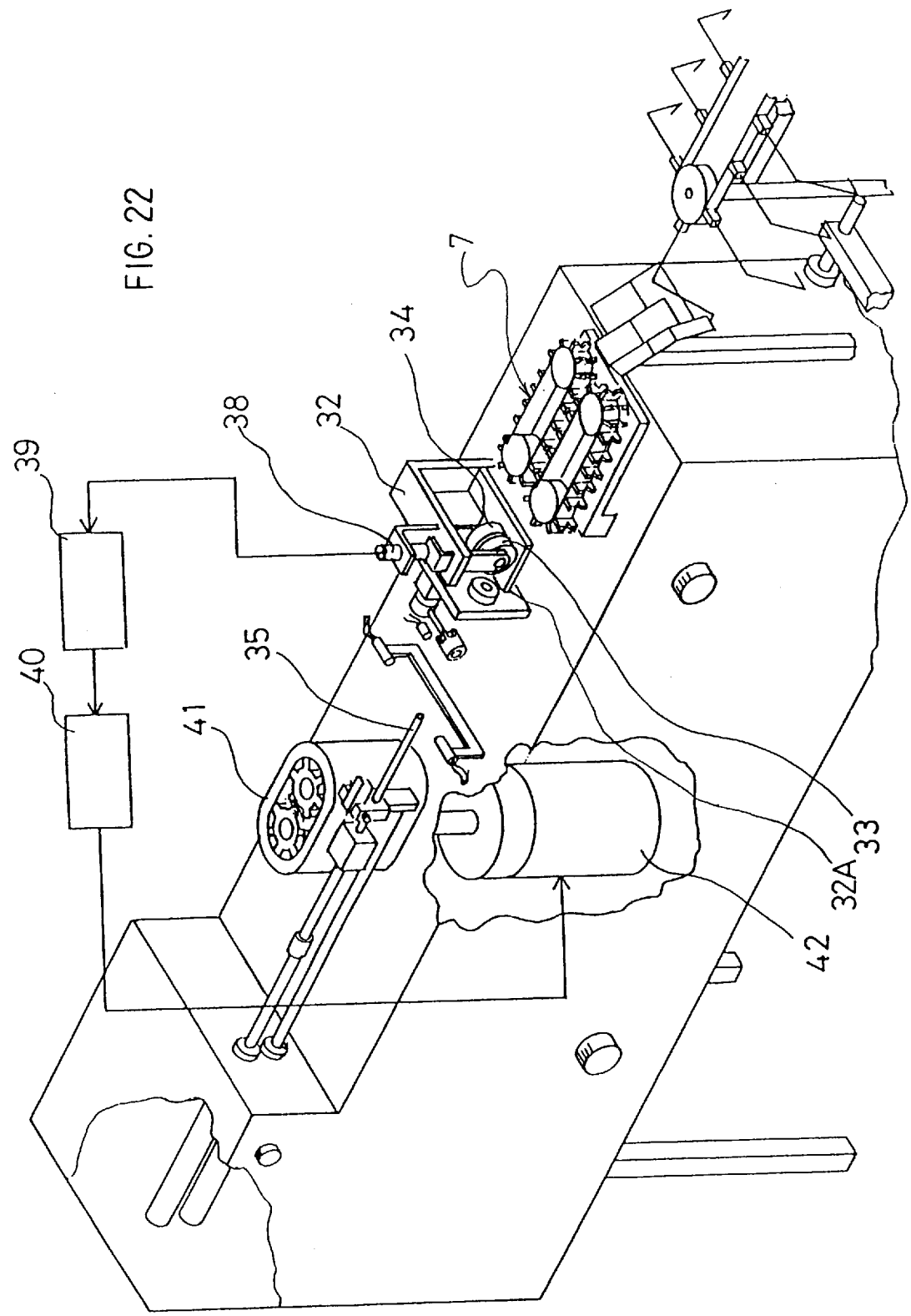
FIG. 22 is a perspective view illustrating an example of a mechanism for detecting a stuffing degree in accordance with the present invention.
Figure 23:
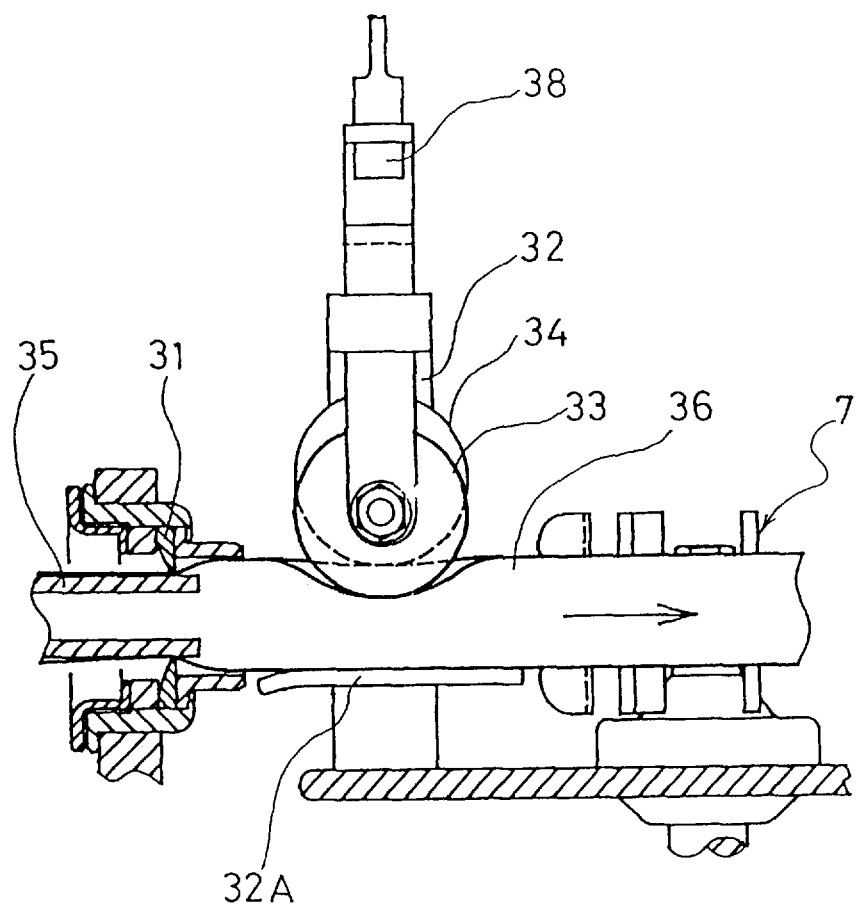
FIG. 23 is an enlarged front elevational view, with portions broken away and in section, of the detecting mechanism shown in FIG. 22.
Figure 24:
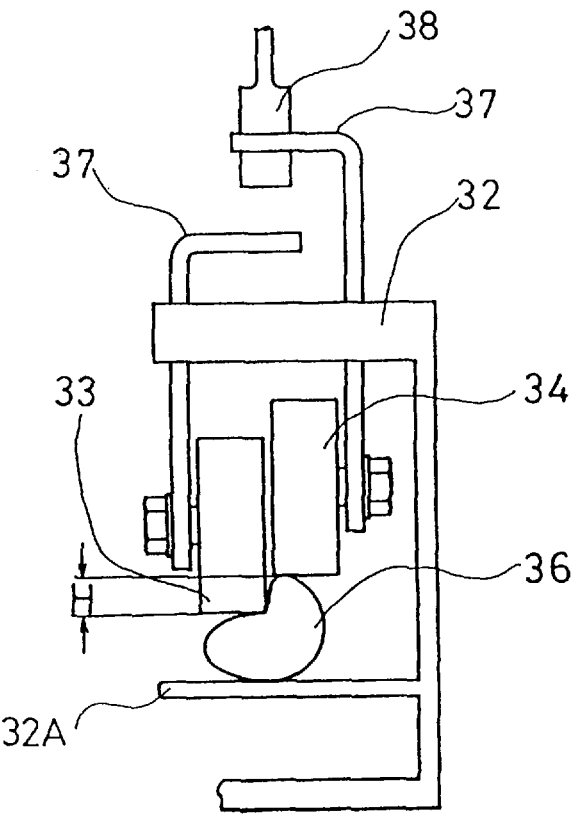
FIG. 24 is an enlarged side elevational view, with portions broken away and in section, of the detectingmechanism shown in FIG. 22.

Hereafter, referring to FIGS. 22 to 24, a description will be given of an example of a controlling device for making the stuffing degree uniform.

A frame member 32 is disposed between a resilient ring 31 and the conveying device 7, and the frame member 32 is provided with a heavy roller weight 33 and a light roller weight 34 which are disposed adjacent to each other in a vertically slidable manner. The roller weights 33 and 34 are disposed at a position where they are placed on a casing 36 filled with the material to be stuffed discharged from a stuffing nozzle 35. As illustrated, a heightwise difference H is produced in the positional relationship between the two roller weights 33 and 34 depending on the degree of stuffing within the casing 36 on a guide portion 32A of the frame member 32. Namely, in the case where the stuffing degree is small (soft), the relative heightwise difference H between the sinking of the heavy roller weight 33 and the sinking of the light roller weight 34 becomes large. In contrast, in the case where the stuffing degree is large (hard), the relative heightwise difference H between the sinking of the heavy roller weight 33 and the sinking of the light roller weight 34 becomes small. To detect this heightwise difference H, displacement-detecting members 37 are fixedly provided on the two roller weights 33 and 34, respectively, and a displacement-detecting sensor 38 is provided for constantly detecting an interval (heightwise difference H) between the two displacement-detecting members 37.

A signal detected by the displacement-detecting sensor 38 is imparted to a motor 42 for driving a stuffing pump 41 via a controlling device 39 and a driver 40, and the number of revolutions of the motor 42 is controlled so as to control the rate of discharge of the material to be stuffed such that the heightwise difference H falls within a fixed range.

Next, referring to FIGS. 25, 26A, and 26B, a description will be given of another example of the controlling device for making the stuffing degree uniform.

In this example, attention is focused on the fact that in the case where the stuffing degree is small (soft), the shape of the sausage or the like encased in the casing becomes an elliptical shape in which the cross section is expanded transversely by lightly pressurizing the stuffed casing, an arrangement is provided such that the amount of stuffing is increased when the cross-sectional shape is elliptical, while the stuffing is continued with the amount of stuffing kept intact when the cross-sectional shape is round.

Figure 25:
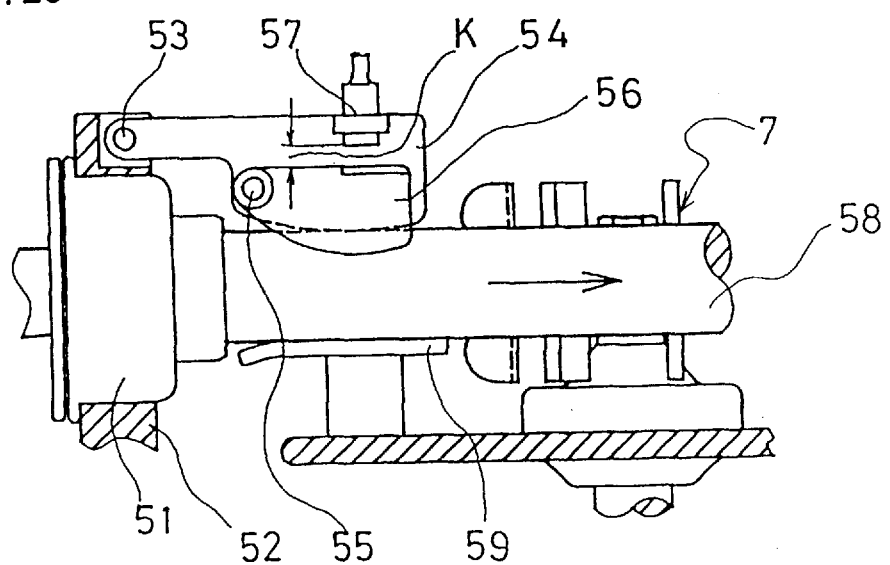
FIG. 25 is an enlarged front elevational view, with portions broken away and in section, of another example of the mechanism for detecting the stuffing degree in accordance with the present invention.
Figure 26A:
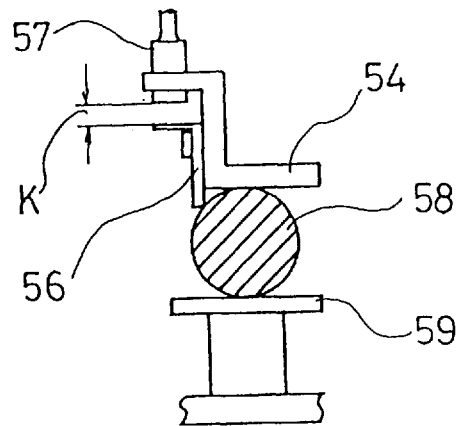
FIG. 26A is a side elevational view illustrating the operation of the detecting mechanism shown in FIG. 24, and illustrates a normal state.
Figure 26B:
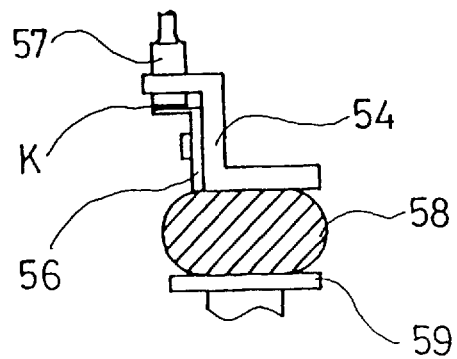
FIG. 26B is a side elevational view illustrating the operation of the detecting mechanism shown in FIG. 24, and illustrates a state in which the stuffing degree has declined.

Referring to FIGS. 25, 26A, and 26B, a main lever 54 which swings with a pin 53 as its axis is provided on a wall member 52 in which an accommodating member 51 for accommodating the resilient ring (not shown) is disposed. A sub-lever 56 which swings with a pin 55 as its axis is provided on top of the main lever 54. A displacement-detecting sensor 57 for detecting a heightwise difference K with respect to the sub-lever 56 is provided on the main lever 54.

In the case where the shape of a casing 58 filled with the material to be stuffed and moving on a guide member 59 is round (in the state shown in FIG. 26A), the heightwise difference K between the main lever 54 and the sub-lever 56 is large. Since the stuffing degree is preferable in this state, the stuffing rate of the material being discharged from the stuffing pump (not shown) is continued as it is.

Now, if the stuffing degree declines, as shown in FIG. 26B, the shape of the casing 58 becomes elliptical. For this reason, the heightwise difference K between the main lever 54 and the sub-lever 56 becomes small, and the rate of discharge from the unillustrated stuffing pump is increased by a signal from the displacement-detecting sensor 57. Consequently, the stuffing rate of the material being discharged from the stuffing nozzle into the casing 58 is increased to increase the degree of stuffing of the casing 58 such that the shape becomes round.

The controlling device according to this example is also applicable to artificial casings having nonuniform outside diameters.

In an apparatus of the type in which the material to be stuffed is passed through the stuffing nozzle, and is then discharged into the casing from the tip of the stuffing nozzle, there are cases where smearing occurs due to the friction with the inner wall of the stuffing nozzle when the material to be stuffed passes through the stuffing nozzle. If the material to be stuffed in this state is discharged into the casing, the product is provided with a turbid outer appearance.

Accordingly, as shown in FIGS. 27A and 27B, the tip of a stuffing nozzle 71 is structured such that the tip is tapered toward the end, and a plurality of slots 71a which are cut from the distal end surface of the stuffing nozzle 71 are provided.

If the slots 71a are thus provided in the tip of the stuffing nozzle 71, agitation occurs in the vicinity of an outer periphery of the stuffed material when the material to be stuffed is discharged into the casing. As a result, the turbidity of the outer appearance due to the smearing is reduced.

Although the present invention has been described above, the structures of the various portions of the apparatus in accordance with the present invention are not necessarily limited to the illustrated embodiments. In addition, the present invention can be implemented by appropriately combining the above-described embodiments, and such combinations are also included.

What is claimed is:

1. A method of encasing sausages or the like for manufacturing nonlinked straight sausages or the like, comprising the steps of:

fitting a natural gut casing over a nonrotatable stuffing nozzle;

inserting a tip of said stuffing nozzle with the natural gut casing fitted over said stuffing nozzle into a hampering member;

causing a material to be stuffed to be discharged continuously from the tip of said stuffing nozzle into the natural gut casing by pressurizing means;

causing the natural gut casing stuffed with the material to be stuffed to be received by a conveying device;

conveying the stuffed natural gut casing in a straight shape away from the tip of said stuffing nozzle by said conveying device which undergoes continuous movement, so as to pull the natural gut casing in its longitudinal direction;

causing a nonrotatable braking member to apply a brake to the natural gut casing being pulled out from over said stuffing nozzle; and continuously discharging the material to be stuffed from said stuffing nozzle into the natural gut casing whose diameter is tending to be reduced as the natural gut casing is stretched out in its longitudinal direction by said hampering member and said conveying device.

2. A method of encasing sausages or the like for manufacturing nonlinked straight sausages or the like, comprising the steps of:

fitting a casing over a nonrotatable stuffing nozzle;

inserting a tip of said stuffing nozzle with the casing fitted over said stuffing nozzle into a hampering member;

causing a material to be stuffed to be discharged continuously from the tip of said stuffing nozzle into the casing by pressurizing means;

causing the casing stuffed with the material to be stuffed to be received by a conveying device;

conveying the stuffed casing in a straight shape away from the tip of said stuffing nozzle by said conveying device which undergoes continuous movement, so as to pull the casing in its longitudinal direction;

causing a nonrotatable braking member to apply a brake to the casing being pulled out from over said stuffing nozzle;

continuously discharging the material to be stuffed from said stuffing nozzle into the casing which is being pulled in its longitudinal direction by said hampering member and said conveying device;

causing the straight stuffed casing conveyed by said conveying device to be suspended from a suspending member of a suspending device in a loop form;

inserting a rod member into the loop of the straight stuffed casing; and delivering the straight stuffed casing in the loop form onto said rod member so as to remove the straight stuffed casing in the loop form from said suspending device.

3. A method of encasing sausages or the like according to claim 2, wherein a lower portion of the loop of the nonlinded straight stuffed casing suspended in the loop form is cut by a loop-cutting device.

4. An apparatus for encasing sausages or the like for manufacturing nonlinked straight sausages or the like, comprising:

pressurizing means for continuously supplying a material to be stuffed;

a nonrotatable stuffing nozzle over which a casing is fitted, and which receives the material to be stuffed fed out from said pressurizing means and discharges the same from a tip thereof;

a nonrotatable hampering member into which the tip of said stuffing nozzle is inserted;

driving means for moving said stuffing nozzle and said hampering member relative to each other and positioning the tip of said stuffing nozzle at a position in which the tip of said stuffing nozzle is inserted in said hampering member and at a position in which the tip of said stuffing nozzle is removed from said hampering member; and a continuously operating conveying device for conveying the casing in which the material to be stuffed is stuffed, wherein the stuffed casing is conveyed while the material to be stuffed is being continuously discharged into the casing from the tip of said stuffing nozzle in a state in which a brake is being applied by said hampering member to a portion of the casing in which the material to be stuffed is stuffed.

5. A method of encasing sausages or the like according to claim 3, wherein said rod member is detachably attached to said suspending device, one suspended portion of the stuffed casing suspended from said suspending member is restricted to a position between a distal end of said rod member and a center of rotation of said suspending member by loop-expanding means provided at a position below said suspending member which moves horizontally, and another suspended portion of the stuffed casing suspended from said suspending member is moved by horizontally moving said suspending member, such that the distal end of said rod member is inserted into the loop of the nonlinked straight stuffed casing.

6. A method of encasing sausages or the like according to 2, wherein said rod member is detachably attached to said suspending device, one suspended portion of the stuffed casing suspended from said suspending member is restricted to a position between a distal end of said rod member and a center of rotation of said suspending member by loop-expanding means provided at a position below said suspending member which moves horizontally, and another suspended portion of the stuffed casing suspended from said suspending member is moved by horizontally moving said suspending member, such that the distal end of said rod member is inserted into the loop of the nonlinked straight stuffed casing.

7. An apparatus for encasing sausages or the like for manufacturing nonlinked straight sausages or the like, comprising:

pressurizing means for continuously supplying a material to be stuffed;

a nonrotatable stuffing nozzle over which a casing is fitted, and which receives the material to be stuffed fed out from said pressurizing means and discharges the same from a tip thereof;

a nonrotatable hampering member into which the tip of said stuffing nozzle is inserted;

driving means for moving said stuffing nozzle and said hampering member relative to each other and positioning the tip of said stuffing nozzle at a position in which the tip of said stuffing nozzle is inserted in said hampering member and at a position in which the tip of said stuffing nozzle is removed from said hampering member;

a continuously operating conveying device for conveying the casing in which the material to be stuffed is stuffed, wherein the stuffed casing is conveyed while the material to be stuffed is being continuously discharged into the casing from the tip of said stuffing nozzle in a state in which a brake is being applied by said hampering member to a portion of the casing in which the material to be stuffed is not stuffed, wherein the casing is an artificial casing;

a positioning member which abuts against a trailing end of the artificial casing;

advancing means for forwardly advancing said positioning member toward the tip of said stuffing nozzle;

detecting means for detecting a forwardly advanced position of said positioning member;

moving means for reciprocating said stuffing nozzle;

nipping members provided in said conveying device to nip the straight stuffed casing; and automatic casing-supplying means for supplying the casing in such a manner that the casing is automatically fitted over said stuffing nozzle.

8. An apparatus for encasing sausages or the like for manufacturing nonlinked straight sausages or the like, comprising:

pressurizing means for continuously supplying a material to be stuffed;

a nonrotatable stuffing nozzle over which a casing is fitted, and which receives the material to be stuffed fed out from said pressurizing means and discharges the same from a tip thereof;

a nonrotatable hampering member into which the tip of said stuffing nozzle is inserted;

driving means for moving said stuffing nozzle and said hampering member relative to each other and positioning the tip of said stuffing nozzle at a position in which the tip of said stuffing nozzle is inserted in said hampering member and at a position in which the tip of said stuffing nozzle is removed from said hampering member;

a continuously operating conveying device for conveying the casing in which the material to be stuffed is stuffed, wherein the stuffed casing is conveyed while the material to be stuffed is being continuously discharged into the casing from the tip of said stuffing nozzle in a state in which a brake is being applied by said hampering member to a portion of the casing in which the material to be stuffed is stuffed, wherein the casing is an artificial casing;

a positioning member which abuts against a trailing end of the artificial casing;

advancing means for forwardly advancing said positioning member toward the tip of said stuffing nozzle;

detecting means for detecting a forwardly advanced position of said positioning member;

moving means for reciprocating said stuffing nozzle;

nipping members provided in said conveying device to nip the straight stuffed casing; and automatic casing-supplying means for supplying the casing in such a manner that the casing is automatically fitted over said stuffing nozzle.

9. An apparatus for encasing sausages or the like for manufacturing nonlinked straight sausages or the like, comprising:

pressurizing means for continuously supplying a material to be stuffed;

a nonrotatable stuffing nozzle over which a casing is fitted, and which receives the material to be stuffed fed out from said pressurizing means and discharges the same from a tip thereof;

a nonrotatable hampering member into which the tip of said stuffing nozzle is inserted;

driving means for moving said stuffing nozzle and said hampering member relative to each other and positioning the tip of said stuffing nozzle at a position in which the tip of said stuffing nozzle is inserted in said hampering member and at a position in which the tip of said stuffing nozzle is removed from said hampering member;

a continuously operating conveying device for conveying the casing in which the material to be stuffed is stuffed, wherein the stuffed casing is conveyed while the material to be stuffed is being continuously discharged into the casing from the tip of said stuffing nozzle in a state in which a brake is being applied by said hampering member to a portion of the casing in which the material to be stuffed is not stuffed, wherein the casing is a natural gut casing;

a positioning member for defining a position of a rear portion of the natural gut casing fitted over said stuffing nozzle; and detecting means for detecting a change in a form of the rear portion of the natural gut casing, said pressurizing means being stopped by said detecting means to complete stuffing.

10. An apparatus for encasing sausages or the like for manufacturing nonlinked straight sausages or the like, comprising:

pressurizing means for continuously supplying a material to be stuffed;

a nonrotatable stuffing nozzle over which a casing is fitted, and which receives the material to be stuffed fed out from said pressurizing means and discharges the same from a tip thereof;

a nonrotatable hampering member into which the tip of said stuffing nozzle is inserted;

driving means for moving said stuffing nozzle and said hampering member relative to each other and positioning the tip of said stuffing nozzle at a position in which the tip of said stuffing nozzle is inserted in said hampering member and at a position in which the tip of said stuffing nozzle is removed from said hampering member;

a continuously operating conveying device for conveying the casing in which the material to be stuffed is stuffed, wherein the stuffed casing is conveyed while the material to be stuffed is being continuously discharged into the casing from the tip of said stuffing nozzle in a state in which a brake is being applied by said hampering member to a portion of the casing in which the material to be stuffed is not stuffed, wherein the casing is a natural gut casing;

a positioning member for defining a position of a rear portion of the natural gut casing fitted over said stuffing nozzle; and detecting means for detecting a change in a form of the rear portion of the natural gut casing, said pressurizing means being stopped by said detecting means to complete stuffing, wherein said positioning member is stopped in a predetermined position while the material to be stuffed is being stuffed into the natural gut casing from said stuffing nozzle.

11. An apparatus for encasing sausages or the like for manufacturing nonlinked straight sausages or the like, comprising:

pressurizing means for continuously supplying a material to be stuffed;

a nonrotatable stuffing nozzle over which a casing is fitted, and which receives the material to be stuffed fed out from said pressurizing means and discharges the same from a tip thereof;

a nonrotatable hampering member into which the tip of said stuffing nozzle is inserted;

driving means for moving said stuffing nozzle and said hampering member relative to each other and positioning the tip of said stuffing nozzle at a position in which the tip of said stuffing nozzle is inserted in said hampering member and at a position in which the tip of said stuffing nozzle is removed from said hampering member;

a continuously operating conveying device for conveying the casing in which the material to be stuffed is stuffed, wherein the stuffed casing is conveyed while the material to be stuffed is being continuously discharged into the casing from the tip of said stuffing nozzle in a state in which a brake is being applied by said hampering member to a portion of the casing in which the material to be stuffed is not stuffed; and means for detecting a degree of stuffing of the casing stuffing with the material to be stuffed, wherein the degree of stuffing of the material to be stuffed in the casing is controlled within a predetermined range by controlling a rate to discharge by said pressurizing means in accordance with the degree of stuffing.

12. An apparatus for encasing sausages for manufacturing nonlinked straight sausages or the like, comprising:

pressurizing means for continuously supplying a material to be stuffed;

a nonrotatable stuffing nozzle over which a casing is fitted, and which receives the material to be stuffed fed out from said pressurizing means and discharges the same from a tip thereof;

a nonrotatable hampering member into which the tip of said stuffing nozzle is inserted;

driving means for moving said stuffing nozzle and said hampering member relative to each other and positioning the tip of said stuffing nozzle at a position in which the tip of said stuffing nozzle is inserted in said hampering member and at a position in which the tip of said stuffing nozzle is removed from said hampering member;

a continuously operating conveying device for conveying the casing in which the material to be stuffed is stuffed, wherein the stuffed casing is conveyed while the material to be stuffed is being continuously discharged into the casing from the tip of said stuffing nozzle in a state in which a brake is being applied by said hampering member to a portion of the casing in which the material to be stuffed is stuffed; and means for detecting a degree of stuffing of the casing stuffing with the material to be stuffed, wherein the degree of stuffing of the material to be stuffed in the casing is controlled within a predetermined range by controlling a rate to discharge by said pressurizing means in accordance with the degree of stuffing.

13. An apparatus for encasing sausages or the like for manufacturing nonlinked straight sausages or the like, comprising:

pressurizing means for continuously supplying a material to be stuffed;

a nonrotatable stuffing nozzle over which a casing is fitted, and which receives the material to be stuffed fed out from said pressurizing means and discharges the same from a tip thereof;

a nonrotatable hampering member into which the tip of said stuffing nozzle is inserted;

driving means for moving said stuffing nozzle and said hampering member relative to each other and positioning the tip of said stuffing nozzle at a position in which the tip of said stuffing nozzle is inserted in said hampering member and at a position in which the tip of said stuffing nozzle is removed from said hampering member;

a continuously operating conveying device for conveying the casing in which the material to be stuffed is stuffed, wherein the stuffed casing is conveyed while the material to be stuffed is being continuously discharged into the casing from the tip of said stuffing nozzle in a state in which a brake is being applied by said hampering member to a portion of the casing in which the material to be stuffed is not stuffed; and a suspending device for suspending the casing stuffed with the material to be stuffed and conveyed by said conveying device, from a suspending member in a loop form.

14. An apparatus for encasing sausages or the like for manufacturing nonlinked straight sausages or the like, comprising:

pressurizing means for continuously supplying a material to be stuffed;

a nonrotatable stuffing nozzle over which a casing is fitted, and which receives the material to be stuffed fed out from said pressurizing means and discharges the same from a tip thereof;

a nonrotatable hampering member into which the tip of said stuffing nozzle is inserted;

driving means for moving said stuffing nozzle and said hampering member relative to each other and positioning the tip of said stuffing nozzle at a position in which the tip of said stuffing nozzle is inserted in said hampering member and at a position in which the tip of said stuffing nozzle is removed from said hampering member;

a continuously operating conveying device for conveying the casing in which the material to be stuffed is stuffed, wherein the stuffed casing is conveyed while the material to be stuffed is being continuously discharged into the casing from the tip of said stuffing nozzle in a state in which a brake is being applied by said hampering member to a portion of the casing in which the material to be stuffed is stuffed; and a suspending device for suspending the casing stuffed with the material to be stuffed and conveyed by said conveying device, from a suspending member in a loop form.

15. An apparatus for encasing sausages or the like according to claim 13 or 14, further comprising:

a loop-cutting device for cutting a lower portion of the nonlinked straight stuffed casing suspended in the loop form.

16. An apparatus for encasing sausages or the like according to claim 13 or 14, wherein said suspending device has means for detachably supporting said rod member, and loop-expanding means for restricting one suspended portio of the stuffed casing suspended from said suspending member to a position between a distal end of said rod member and a center of below said suspending member which moves horizontally, such that the distal end of said rod member is inserted into the loop of the nonlinked straight stuffed casing.

17. An apparatus for encasing sausages or the like according to claim 15, wherein said suspending device has means for detachably supporting said rod member, and loop-expanding means for restricting one suspended portion of the stuffed casing suspended from said suspending member to a position between a distal end of said rod member and a center of rotation of said suspending member is provided at a position below said suspending member which moves horizontally, such that the distal end of said rod member is inserted into the loop of the nonlinked straight stuffed casing.

18. An apparatus for encasing sausages or the like for manufacturing nonlinked straight sausages or the like, comprising:

pressurizing means for continuously supplying a material to be stuffed;

a nonrotatable stuffing nozzle over which a casing is fitted, and which receives the material to be stuffed fed out from said pressurizing means and discharges the same from a tip thereof;

a nonrotatable hampering member into which the tip of said stuffing nozzle is inserted;

driving means for moving said stuffing nozzle and said hampering member relative to each other and positioning the tip of said stuffing nozzle at a position in which the tip of said stuffing nozzle is inserted in said hampering member and at a position in which the tip of said stuffing nozzle is removed from said hampering member;

a continuously operating conveying device for conveying the casing in which the material to be stuffed is stuffed, wherein the stuffed casing is conveyed while the material to be stuffed is being continuously discharged into the casing from the tip of said stuffing nozzle in a state in which a brake is being applied by said hampering member to a portion of the casing in which the material to be stuffed is not stuffed; and linking means for twisting the straight stuffed casing fed out from said conveying device to form a linked stuffed casing.

19. An apparatus for encasing sausages or the like for manufacturing nonlinked straight sausages or the like, comprising:

pressurizing means for continuously supplying a material to be stuffed;

a nonrotatable stuffing nozzle over which a casing is fitted, and which receives the material to be stuffed fed out from said pressurizing means and discharges the same from a tip thereof;

a nonrotatable hampering member into which the tip of said stuffing nozzle is inserted;

driving means for moving said stuffing nozzle and said hampering member relative to each other and positioning the tip of said stuffing nozzle at a position in which the tip of said stuffing nozzle is inserted in said hampering member and at a position in which the tip of said stuffing nozzle is removed from said hampering member;

a continuously operating conveying device for conveying the casing in which the material to be stuffed is stuffed, wherein the stuffed casing is conveyed while the material to be stuffed is being continuously discharged into the casing from the tip of said stuffing nozzle in a state in which a brake is being applied by said hampering member to a portion of the casing in which the material to be stuffed is stuffed; and linking means for twisting the straight stuffed casing fed out from said conveying device to form a linked stuffed casing.

20. An apparatus for encasing sausages or the like for manufacturing nonlinked straight sausages or the like, comprising:

pressurizing means for continuously supplying a material to be stuffed;

a nonrotatable stuffing nozzle over which a casing is fitted, and which receives the material to be stuffed fed out from said pressurizing means and discharges the same from a tip thereof;

a nonrotatable hampering member into which the tip of said stuffing nozzle is inserted;

driving means for moving said stuffing nozzle and said hampering member relative to each other and positioning the tip of said stuffing nozzle at a position in which the tip of said stuffing nozzle is inserted in said hampering member and at a position in which the tip of said stuffing nozzle is removed from said hampering member;

a continuously operating conveying device for conveying the casing in which the material to be stuffed is stuffed, wherein the stuffed casing is conveyed while the material to be stuffed is being continuously discharged into the casing from the tip of said stuffing nozzle in a state in which a brake is being applied by said hampering member to a portion of the casing in which the material to be stuffed is not stuffed, wherein the casing is an artificial casing;

a positioning member which abuts against a trailing end of the artificial casing; advancing means for forwardly advancing said positioning member toward the tip of said stuffing nozzle;

detecting means for detecting a forwardly advanced position of said positioning member;

moving means for reciprocating said stuffing nozzle;

nipping members provided in said conveying device to nip the straight stuffed casing;

automatic casing-supplying means for supplying the casing in such a manner that the casing is automatically fitted over said stuffing nozzle; and a suspending device for suspending the casing stuffed with the material to be stuffed and conveyed by said conveying device, from a suspending member in a loop form.

21. An apparatus for encasing sausages or the like for manufacturing nonlinked straight sausages or the like, comprising:

pressurizing means for continuously supplying a material to be stuffed;

a nonrotatable stuffing nozzle over which a casing is fitted, and which receives the material to be stuffed fed out from said pressurizing means and discharges the same from a tip thereof;

a nonrotatable hampering member into which the tip of said stuffing nozzle is inserted;

driving means for moving said stuffing nozzle and said hampering member relative to each other and positioning the tip of said stuffing nozzle at a position in which the tip of said stuffing nozzle is inserted in said hampering member and at a position in which the tip of said stuffing nozzle is removed from said hampering member;

a continuously operating conveying device for conveying the casing in which the material to be stuffed is stuffed, wherein the stuffed casing is conveyed while the material to be stuffed is being continuously discharged into the casing from the tip of said stuffing nozzle in a state in which a brake is being applied by said hampering member to a portion of the casing in which the material to be stuffed is stuffed, wherein the casing is an artificial casing;

a positioning member which abuts against a trailing end of the artificial casing; advancing means for forwardly advancing said positioning member toward the tip of said stuffing nozzle;

detecting means for detecting a forwardly advanced position of said positioning member;

moving means for reciprocating said stuffing nozzle;

nipping members provided in said conveying device to nip the straight stuffed casing;

automatic casing-supplying means for supplying the casing in such a manner that the casing is automatically fitted over said stuffing nozzle; and a suspending device for suspending the casing stuffed with the material to be stuffed and conveyed by said conveying device, from a suspending member in a loop form.

22. An apparatus for encasing sausages or the like for manufacturing nonlinked straight sausages or the like, comprising:

pressurizing means for continuously supplying a material to be stuffed;

a nonrotatable stuffing nozzle over which a casing is fitted, and which receives the material to be stuffed fed out from said pressurizing means and discharges the same from a tip thereof;

a nonrotatable hampering member into which the tip of said stuffing nozzle is inserted;

driving means for moving said stuffing nozzle and said hampering member relative to each other and positioning the tip of said stuffing nozzle at a position in which the tip of said stuffing nozzle is inserted in said hampering member and at a position in which the tip of said stuffing nozzle is removed from said hampering member;

a continuously operating conveying device for conveying the casing in which the material to be stuffed is stuffed, wherein the stuffed casing is conveyed while the material to be stuffed is being continuously discharged into the casing from the tip of said stuffing nozzle in a state in which a brake is being applied by said hampering member to a portion of the casing in which the material to be stuffed is not stuffed, wherein the casing is an artificial casing;

a positioning member which abuts against a trailing end of the artificial casing; advancing means for forwardly advancing said positioning member toward the tip of said stuffing nozzle;

detecting means for detecting a forwardly advanced position of said positioning member;

moving means for reciprocating said stuffing nozzle;

nipping members provided in said conveying device to nip the straight stuffed casing;

automatic casing-supplying means for supplying the casing in such a manner that the casing is automatically fitted over said stuffing nozzle; and linking means for twisting the straight stuffed casing fed out from said conveying device to form a linked stuffed casing.

23. An apparatus for encasing sausages or the like for manufacturing nonlinked straight sausages or the like, comprising:

pressurizing means for continuously supplying a material to be stuffed;

a nonrotatable stuffing nozzle over which a casing is fitted, and which receives the material to be stuffed fed out from said pressurizing means and discharges the same from a tip thereof;

a nonrotatable hampering member into which the tip of said stuffing nozzle is inserted;

driving means for moving said stuffing nozzle and said hampering member relative to each other and positioning the tip of said stuffing nozzle at a position in which the tip of said stuffing nozzle is inserted in said hampering member and at a position in which the tip of said stuffing nozzle is removed from said hampering member;

a continuously operating conveying device for conveying the casing in which the material to be stuffed is stuffed, wherein the stuffed casing is conveyed while the material to be stuffed is being continuously discharged into the casing from the tip of said stuffing nozzle in a state in which a brake is being applied by said hampering member to a portion of the casing in which the material to be stuffed is stuffed, wherein the casing is an artificial casing;

a positioning member which abuts against a trailing end of the artificial casing; advancing means for forwardly advancing said positioning member toward the tip of said stuffing nozzle;

detecting means for detecting a forwardly advanced position of said positioning member;

moving means for reciprocating said stuffing nozzle;

nipping members provided in said conveying device to nip the straight stuffed casing;

automatic casing-supplying means for supplying the casing in such a manner that the casing is automatically fitted over said stuffing nozzle; and linking means for twisting the straight stuffed casing fed out from said conveying device to form a linked stuffed casing.

\* \* \* \* \*